United States Patent
Ellis et al.

(10) Patent No.: US 11,651,399 B2
(45) Date of Patent: *May 16, 2023

(54) SYSTEM AND METHOD FOR PROVIDING TRANSACTION-BASED PROFIT SOLUTIONS

(71) Applicant: Mindbody, Inc., San Luis Obispo, CA (US)

(72) Inventors: Peter Ellis, Indian Wells, CA (US); Daniel Lizio-Katzen, New York, NY (US)

(73) Assignee: Mindbody, Inc., San Luis Obispo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/443,283

(22) Filed: Jul. 23, 2021

(65) Prior Publication Data
US 2021/0350430 A1 Nov. 11, 2021

Related U.S. Application Data

(63) Continuation of application No. 16/020,379, filed on Jun. 27, 2018, now Pat. No. 11,074,630, which is a
(Continued)

(51) Int. Cl.
*G06Q 30/06* (2012.01)
*G06Q 40/00* (2023.01)

(52) U.S. Cl.
CPC ............. *G06Q 30/06* (2013.01); *G06Q 40/00* (2013.01)

(58) Field of Classification Search
USPC .......................................................... 705/38
See application file for complete search history.

(56) References Cited

U.S. PATENT DOCUMENTS

| 4,359,631 A | 11/1982 | Lockwood et al. |
| 5,983,200 A * | 11/1999 | Slotznick ........... G06Q 30/0621 705/28 |

(Continued)

FOREIGN PATENT DOCUMENTS

| JP | 2002032675 | 1/2002 |
| JP | 2002170162 | 6/2002 |

(Continued)

OTHER PUBLICATIONS

A. Grosso, C. Vecchiola, M. Coccoli and A. Boccalatte, "A multiuser groupware calendar system based on agent tools and technology," Proceedings of the 2005 International Symposium on Collaborative Technologies and Systems, 2005., pp. 144-151, (Multiuser). (Year: 2005).*

(Continued)

*Primary Examiner* — Chikaodinaka Ojiaku
(74) *Attorney, Agent, or Firm* — DLA Piper LLP (US)

(57) ABSTRACT

A method and system for generating profit having a partner transaction module configured to charge a partner transaction fee for a transaction performed by a partner, and receive, from a partner, payment for the partner transaction fee when the partner performs a transaction, a base transaction module configured to pay, in the event the partner performs a transaction through a third party, a base transaction fee to the third party, wherein the base transaction fee is equal to or lesser than the partner transaction fee, and a profit module configured to receive a profit on the transaction, wherein the profit is the difference between the partner transaction fee and the base transaction fee.

20 Claims, 26 Drawing Sheets

Related U.S. Application Data continuation of application No. 12/250,838, filed on Oct. 14, 2008, now abandoned.

(56) References Cited

U.S. PATENT DOCUMENTS

| | | | |
|---|---|---|---|
| 6,029,141 A * | 2/2000 | Bezos | G06Q 30/0214 |
| | | | 705/7.29 |
| 6,079,863 A | 6/2000 | Farukawa et al. | |
| 6,108,640 A * | 8/2000 | Slotznick | G06Q 20/102 |
| | | | 705/40 |
| 6,243,688 B1 * | 6/2001 | Kalina | B42D 12/00 |
| | | | 705/14.18 |
| 6,389,454 B1 | 5/2002 | Ralston et al. | |
| 6,754,833 B1 * | 6/2004 | Black | G06F 21/6227 |
| | | | 713/169 |
| 6,907,305 B2 * | 6/2005 | Mata | G06Q 10/06312 |
| | | | 700/121 |
| 7,069,228 B1 | 6/2006 | Rose et al. | |
| 7,188,073 B1 | 3/2007 | Tam et al. | |
| 7,702,577 B1 | 4/2010 | Dickelman | |
| 7,848,940 B1 | 12/2010 | Harniman et al. | |
| 7,873,540 B2 | 1/2011 | Arumugam | |
| 7,882,026 B1 * | 2/2011 | Zettner | G06Q 40/025 |
| | | | 705/38 |
| 8,069,407 B1 | 11/2011 | Armandpour et al. | |
| 8,082,183 B2 * | 12/2011 | Chowdhary | G06Q 30/0625 |
| | | | 705/28 |
| 8,271,878 B2 * | 9/2012 | Kane | G06Q 30/02 |
| | | | 715/744 |
| 8,364,521 B2 | 1/2013 | Ramer et al. | |
| 8,370,186 B2 * | 2/2013 | Ellis | G06Q 30/02 |
| | | | 705/7.19 |
| 8,527,355 B2 * | 9/2013 | Milone | G06Q 40/04 |
| | | | 705/26.1 |
| 8,595,114 B2 * | 11/2013 | DeLillio | G06Q 40/12 |
| | | | 705/36 R |
| 8,615,719 B2 | 12/2013 | Ramer et al. | |
| 8,620,739 B1 * | 12/2013 | Frederick | G06Q 30/0231 |
| | | | 705/14.33 |
| 8,660,891 B2 | 2/2014 | Ramer et al. | |
| 8,666,376 B2 | 3/2014 | Ramer et al. | |
| 8,688,671 B2 | 4/2014 | Ramer et al. | |
| 8,788,278 B2 * | 7/2014 | Scribner | G06Q 30/0233 |
| | | | 705/14.1 |
| 2001/0005831 A1 | 6/2001 | Lewin et al. | |
| 2001/0011225 A1 | 8/2001 | O'Connor et al. | |
| 2001/0037226 A1 | 11/2001 | Kurokawa | |
| 2001/0039584 A1 * | 11/2001 | Nobakht | H04N 21/4381 |
| | | | 348/E7.071 |
| 2001/0047282 A1 * | 11/2001 | Raveis, Jr. | G06Q 30/0245 |
| | | | 707/999.009 |
| 2002/0002478 A1 | 1/2002 | Swart et al. | |
| 2002/0019742 A1 | 2/2002 | Kinoshita | |
| 2002/0019755 A1 | 2/2002 | Kagami | |
| 2002/0046070 A1 | 4/2002 | Konishi | |
| 2002/0065688 A1 * | 5/2002 | Charlton | G06Q 10/02 |
| | | | 705/5 |
| 2002/0069146 A1 * | 6/2002 | Huang | G06Q 30/04 |
| | | | 705/26.1 |
| 2002/0069176 A1 * | 6/2002 | Newman | G06Q 20/24 |
| | | | 705/40 |
| 2003/0023687 A1 * | 1/2003 | Wolfe | G06Q 30/06 |
| | | | 709/227 |
| 2003/0074310 A1 * | 4/2003 | Grovit | G06Q 20/04 |
| | | | 705/39 |
| 2003/0115085 A1 | 6/2003 | Satoh | |
| 2003/0144053 A1 * | 7/2003 | Michaelson | A63F 13/792 |
| | | | 463/16 |
| 2004/0064371 A1 | 4/2004 | Crapo | |
| 2004/0220816 A1 * | 11/2004 | Brush | G06Q 30/02 |
| | | | 705/313 |
| 2004/0230476 A1 * | 11/2004 | Messer | G06Q 30/0277 |
| | | | 705/14.69 |
| 2004/0236619 A1 * | 11/2004 | Gundersen | G06Q 10/0639 |
| | | | 705/7.42 |
| 2004/0236669 A1 | 11/2004 | Horst et al. | |
| 2005/0027580 A1 * | 2/2005 | Crici | G06Q 10/1095 |
| | | | 705/7.19 |
| 2005/0055252 A1 * | 3/2005 | Todd | G06Q 10/02 |
| | | | 705/5 |
| 2005/0065877 A1 | 3/2005 | Cleary et al. | |
| 2005/0144642 A1 | 6/2005 | Ratterman | |
| 2005/0246627 A1 * | 11/2005 | Sayed | G06Q 30/0605 |
| | | | 715/234 |
| 2005/0278644 A1 * | 12/2005 | Greaves | G06Q 30/0641 |
| | | | 715/962 |
| 2006/0020515 A1 * | 1/2006 | Lee | G06Q 20/203 |
| | | | 705/22 |
| 2006/0064313 A1 | 3/2006 | Steinbarth et al. | |
| 2006/0085277 A1 * | 4/2006 | Arnston | G06Q 30/0603 |
| | | | 705/26.8 |
| 2006/0106665 A1 * | 5/2006 | Kumar | G06Q 30/0201 |
| | | | 705/7.29 |
| 2006/0149620 A1 * | 7/2006 | Reed | G06Q 30/0279 |
| | | | 705/26.1 |
| 2006/0224490 A1 * | 10/2006 | Seth | G06Q 10/1097 |
| | | | 705/37 |
| 2007/0038931 A1 | 2/2007 | Allaire et al. | |
| 2007/0208671 A1 * | 9/2007 | Brown | G06Q 20/341 |
| | | | 705/65 |
| 2007/0244756 A1 * | 10/2007 | Stucki | G06Q 30/02 |
| | | | 705/14.35 |
| 2007/0250398 A1 * | 10/2007 | Chowdhary | G06Q 10/083 |
| | | | 705/26.81 |
| 2007/0271129 A1 | 11/2007 | Dutton et al. | |
| 2007/0282654 A1 * | 12/2007 | Sarkar | G06Q 10/1095 |
| | | | 705/7.19 |
| 2008/0071625 A1 * | 3/2008 | Arumugam | G06Q 20/20 |
| | | | 705/17 |
| 2008/0097814 A1 | 4/2008 | Koustoumbardis | |
| 2008/0103968 A1 | 5/2008 | Bies et al. | |
| 2008/0133350 A1 | 6/2008 | White et al. | |
| 2008/0167946 A1 * | 7/2008 | Bezos | G06Q 30/0214 |
| | | | 705/26.1 |
| 2008/0195476 A1 * | 8/2008 | Marchese | G06Q 10/087 |
| | | | 705/28 |
| 2008/0235107 A1 * | 9/2008 | Nagarajayya | G06Q 30/0625 |
| | | | 705/26.62 |
| 2008/0270298 A1 * | 10/2008 | McElroy | G06Q 40/00 |
| | | | 705/39 |
| 2008/0275741 A1 * | 11/2008 | Loeffen | G06Q 10/02 |
| | | | 705/26.1 |
| 2008/0281688 A1 * | 11/2008 | Kluth | G06Q 30/0239 |
| | | | 705/26.1 |
| 2008/0288396 A1 | 11/2008 | Siggers et al. | |
| 2008/0306789 A1 * | 12/2008 | Fell | G06Q 10/0635 |
| | | | 705/4 |
| 2009/0070181 A1 * | 3/2009 | Loeffen | G06Q 10/02 |
| | | | 705/5 |
| 2009/0112738 A1 * | 4/2009 | Nagata | G06Q 30/04 |
| | | | 705/28 |
| 2009/0119176 A1 * | 5/2009 | Johnson | G06Q 20/04 |
| | | | 705/14.27 |
| 2009/0119190 A1 * | 5/2009 | Realini | G06Q 20/3265 |
| | | | 705/37 |
| 2009/0234680 A1 | 9/2009 | Newton | |
| 2009/0254971 A1 * | 10/2009 | Herz | G06Q 30/0603 |
| | | | 726/1 |
| 2009/0287596 A1 * | 11/2009 | Torrenegra | G06Q 40/04 |
| | | | 705/37 |
| 2010/0076810 A1 * | 3/2010 | Loeffen | G06Q 30/0601 |
| | | | 705/26.1 |
| 2010/0076843 A1 * | 3/2010 | Ashton | G06Q 30/06 |
| | | | 705/26.1 |
| 2010/0082442 A1 * | 4/2010 | Ma | G06Q 30/0603 |
| | | | 705/14.73 |
| 2010/0094695 A1 * | 4/2010 | Gaik | G06Q 30/02 |
| | | | 705/14.16 |
| 2010/0094739 A1 | 4/2010 | Ellis et al. | |

(56) References Cited

U.S. PATENT DOCUMENTS

| | | | |
|---|---|---|---|
| 2010/0098225 A1* | 4/2010 | Ashton | H04M 3/4938 379/88.19 |
| 2010/0106668 A1* | 4/2010 | Hawthorne | G06Q 10/10 707/E17.015 |
| 2010/0312464 A1* | 12/2010 | Fitzgerald | G06Q 30/02 701/532 |
| 2011/0119128 A1* | 5/2011 | Fang | G06Q 30/0251 705/14.49 |
| 2011/0179155 A1* | 7/2011 | Ravichandran | H04L 67/02 709/223 |
| 2011/0307478 A1* | 12/2011 | Pinckney | G06F 16/583 707/724 |
| 2011/0320251 A1* | 12/2011 | Ates | G06Q 30/0227 705/14.28 |
| 2012/0066015 A1* | 3/2012 | Loeffen | G06Q 10/1095 705/5 |
| 2012/0179499 A1* | 7/2012 | Loeffen | G06Q 30/0601 705/5 |
| 2012/0190386 A1* | 7/2012 | Anderson | G01S 19/14 455/456.3 |
| 2013/0103749 A1* | 4/2013 | Werth | H04L 41/0816 709/203 |
| 2014/0348143 A1* | 11/2014 | Kato | H04W 52/0206 370/336 |
| 2015/0052009 A1* | 2/2015 | Ketchell, III | G06Q 20/065 705/26.8 |
| 2016/0117642 A1* | 4/2016 | Sandhu | G06Q 10/1053 705/321 |
| 2017/0125141 A1* | 5/2017 | Smith | H01C 1/142 |
| 2018/0081646 A1* | 3/2018 | Bugrov | G06F 9/454 |
| 2019/0266690 A1* | 8/2019 | Mandeno | G06Q 10/06 |

FOREIGN PATENT DOCUMENTS

| | | |
|---|---|---|
| JP | 2002197330 | 7/2002 |
| JP | 2004029959 | 1/2004 |
| JP | 2004272834 | 9/2004 |

OTHER PUBLICATIONS

W. N. Y. Yan and D. K. W. Chiu, "Enhancing E-Commerce Processes with Alerts and Web Services: A Case Study on Online Credit Card Payment Notification," 2007 International Conference on Machine Learning and Cybernetics, Hong Kong, China, 2007, pp. 3831-3837, (E-Commerce). (Year: 2007).*

U.S. Appl. No. 12/250,838, Appeal Brief filed Jul. 11, 2016, 43 pages.

U.S. Appl. No. 12/250,838, Appeal Decision Mailed May 18, 2018, 26 pages.

U.S. Appl. No. 12/250,838, Examiner Interview Summary dated Jun. 6, 2012, 4 pages.

U.S. Appl. No. 12/250,838, Examiner's Answer dated Oct. 12, 2016, 26 pages.

U.S. Appl. No. 12/250,838, Examiner's Answer to Appeal Brief Mailed Oct. 12, 2016, 26 pages.

U.S. Appl. No. 12/250,838, Final Office Action dated Jan. 5, 2012, 11 pages.

U.S. Appl. No. 12/250,838, Final Office Action dated Feb. 11, 2016, 32 pages.

U.S. Appl. No. 12/250,838, Final Office Action dated Jul. 14, 2015, 21 pages.

U.S. Appl. No. 12/250,838, Non Final Office Action dated May 4, 2011, 10 pages.

U.S. Appl. No. 12/250,838, Non Final Office Action dated Sep. 23, 2014, 20 pages.

U.S. Appl. No. 12/250,838, Non Final Office Action dated Oct. 22, 2015, 24 pages.

U.S. Appl. No. 12/250,838, Reply Brief filed Dec. 12, 2016, 7 pages.

U.S. Appl. No. 12/250,838, Response filed Jan. 22, 2016 to Non Final Office Action dated Oct. 22, 2015, 27 pages.

U.S. Appl. No. 12/250,838, Response filed Mar. 23, 2015 to Non Final Office Action dated Sep. 23, 2014, 22 pages.

U.S. Appl. No. 12/250,838, Response filed Apr. 5, 2012 to Final Office Action dated Jan. 5, 2012, 12 pages.

U.S. Appl. No. 12/250,838, Response filed Oct. 14, 2015 to Final Office Action dated Jul. 14, 2015, 26 pages.

U.S. Appl. No. 12/250,838, Response filed Oct. 31, 2011 to Non Final Office Action dated May 4, 2011, 11 pages.

U.S. Appl. No. 12/250,838, Supplemental Amendment dated Jun. 7, 2012, 14 pages.

Lamon, "Credit Card Transactions Real World and Online", Payment Process Overview, 1996, 17 pages.

Yan, et al., "Enhancing e-commerce processes with alerts and web services: A case study on online credit card payment notification," 2007 International Conference on Machine Learning and Cybernetics, vol. 7, IEEE, 2007, pp. 3831-3837.

* cited by examiner

Fig. 8

ON-LINE BOOKING SYSTEM

Calendar | Find Appointment | New Appointment

Welcome: Spa Admin
Settings | Log Out | Other

Appointments | Customers | Orders | Schedules | Reports | Other

General Settings – Appointments & Notifications Manager          Search

Send Notification to: [spagoer@server.com]
Customer's Reply-To Email: [spadc@spa.com]
Receive Email for New Appointments Internally: ■Yes □No
Other Notifications Settings Appointment Start Interval: [30 mins ▼]
Allow Appointments to End After Closing Time: ■Yes □No
Other Appointment Settings

[Reset] [Save & Continue ▶]

ON-LINE BOOKING SYSTEM

Calendar | Find Appointment | New Appointment

Welcome: Spa Manager
Settings | Log Out | Other

Appointments | Customers | Orders | Schedules | Reports | Other

Spa Settings
☑ *Employee*
☐ *Room/Facility*
☐ *Price Range*

Jane Doe
Jill J. James
Joe A. Smith
Marty Moe
Suzie Soh
Tom Tool
Zachary McFoo
Zoe Roth

Joe A. Smith: Personal Employee Information

Employee Info | Specialties | Default Schedule | History | Payroll | Other

First Name: [Joe A.]  Last Name: [Smith]
Employee Type: [Scheduled ▼]
Pay Type: ☐ Flat Hourly $ [   ▼]  ☐ Per Treatment
☐ Commission  ☑ Salary  ☐ Other
Vacation Days: [0]  Sick Days: [0]
Other: [       ]

Contact Information
Address:  [100 E Street, N.W.]
         [DC ▼] Zip: [20055]
Phone:   [202-255-7898]
Email:   [spagoer@server.com]

ON-LINE BOOKING SYSTEM

Calendar | Find Appointment | New Appointment

Welcome: Spa Manager
Settings | Log Out | Other

Appointments | Customers | Orders | Schedules | Reports | Other

Spa Settings
☑ *Employee*
☐ *Room/Facility*
☐ *Price Range*

Jane Doe
Jill J. James
Joe A. Smith
Marty Moe
Suzie Soh
Tom Tool
Zachary McFoo
Zoe Roth

Joe A. Smith: History

Employee Info | Specialties | Default Schedule | History | Payroll | Other

| Order No. | Status | Customer/Contact | Room | Appointment | Other |
|---|---|---|---|---|---|
| 10004 | Check-in | Spa Goer spagoer@server.com | Room A | July 5, 2008, 1:30p | Other |
| 10003 | Booked | Doris Woods 202-554-9988 | Miguel's Room | July 5, 2008, 10:00a | Other |
| 09991 | Booked | Hope Willis 212-888-5000 | Manicure | July 5, 2008, 11:30a | Other |
| 09987 | Booked | Tamika Robbins trobbins@server.com | Room B | July 3, 2008, 3:00p | Other |
| 09974 | Paid | Harry Jones 202-888-4100 | Serenity Room | June 22, 2008, 1:00p | Other |
| 09972 | Cancelled | Joy Harris superjoy@email.com | Room A | June 20, 2008, 1:15p | Other |
| 09963 | Paid | Chris Martin cmart@music.com | Room A | June 19, 2008, 2:30p | Other |

Fig. 19

ON-LINE BOOKING SYSTEM

Welcome: Spa Manager
Settings | Log Out | Other

Calendar | Find Appointment | New Appointment

| Appointments | Customers | Orders | Schedules | Reports | Other |

Find a User

User Name:

User Type:
All

[Search]  New Search

Edit User

Name: Spa Goer
Email: spagoer@server.com
Type: Spa User
Roles: ☑Admin ☐Reporting ☐Reservationist ☐Techncian ☐Other

Login
Username: Spa Goer
Password: xxxxxxxx
Retype Password: xxxxxxxx

[Cancel] [Submit ▶]

Fig. 20

ON-LINE BOOKING SYSTEM

Calendar | Find Appointment | New Appointment

Welcome: Joe A. Smith
Settings | Log Out | Other

Appointments | Customers | Orders | Schedules | Reports | Other

Find Customer

User Name:

User Type:
All

[Search] New Search

☐ Include customers

Edit Customer

Results 1-10 of 35

User Search Results

| Name | Roles | Username | Date Created | Actions |
|---|---|---|---|---|
| Spa D. | Admin | spadude | July 5, 2008, 1:30p | Edit/Delete |
| Luv S. | Admin | luvspas | May 5, 2008, 10:00a | Edit/Delete |
| Spa Admin | Admin | sysadmin | April 25, 2008, 11:30a | Edit/Delete |
| Bo Bice | Technician | supernicetouchbo | March 3, 2008, 3:00p | Edit/Delete |
| O. L. L. | Admin | ooolala | July 5, 2008, 1:30p | Edit/Delete |
| Waldorf Astoria | Admin | waldorfastoria | May 5, 2008, 10:00a | Edit/Delete |
| Happy G. | Admin | gilmore_happy | April 25, 2008, 11:30a | Edit/Delete |
| Joe S. | Technician | josephschmoeseph | March 3, 2008, 3:00p | Edit/Delete |
| Napoleon D. | Admin | voteforpedro | July 5, 2008, 1:30p | Edit/Delete |
| Shaka K. | Reservationist | shakakhanha | May 5, 2008, 10:00a | Edit/Delete |

Fig. 21

ON-LINE BOOKING SYSTEM

Calendar | Find Appointment | New Appointment

Welcome: Spa Manager
Settings | Log Out | Other

| Appointments | Customers | Orders | Schedules | Reports | Other |

Spa Settings
  Specials

[Reset] [Save & Continue ▶] Search

Add Special | Edit Special

Search Specials:
[          ]

Specials Code:
[          ]

[Search]  New Search

| Name: | Code: | Dates: | Discount: |
|---|---|---|---|
| Botox Loyalty Special | BOTOX2 | May 3 – May 9, 2008 | 20% |
| Facial Loyalty Special | FACIAL4 | May 12 – May 14, 2008 | 15% |
| Friends & Family | FRIFAM3 | April, 2008 | 10% |
| Spring Hair Removal | NOHAIR1 | Mar 20 – May 8, 2008 | $10 off |
| Hands Day Special | HANDZ3 | June 9, 2008 | 50% |
| Massage Loyalty Special | RUBME | Mar 10 – Mar 14, 2008 | 20% |
| Complimentary Manicure | COMP2 | February 2, 2008 | FREE |
| Winter Splash Special | WINTER2 | January, 2008 | 2 for 1 |
| Feet Day Special | 2FEET | July 2, 2008 | 50% |

Fig. 22

SYSTEM AND METHOD FOR PROVIDING TRANSACTION-BASED PROFIT SOLUTIONS

CROSS-REFERENCE TO RELATED APPLICATION

This application is a continuation of U.S. application Ser. No. 16/020,379, filed Jun. 27, 2018, which is a continuation of U.S. application Ser. No. 12/250,838, filed Oct. 14, 2008, which are incorporated by reference in their entireties.

BACKGROUND INFORMATION

On-line shopping has become extremely popular with consumers. It provides a convenient way for people to purchase a variety of products and services without leaving the home or office. When offering items or services for sale, a vendor may use a website to present its products or services to customers browsing that website. However, such a business model may insist that a customer already know the vendor's website or be able to find the website via a search engine. In addition, in order to secure an order for a particular service (e.g., spa treatment and other related service), for example, a vendor may use a singular, stand-alone reservation system that is only available on its website. Not only does this make it difficult to attract new customers, but such a technique may not adequately rate or compare these products/services with other comparable products/services, which may limit customer confidence. Furthermore, a stand-alone reservation system that is not linked with or safeguarded by other systems or methods may be prone to error and mismanagement. As a result, current on-line systems and methods may lack comprehensive and effective web-based management solutions particularly advantageous for booking appointments, attracting new customers, gaining customer confidence, increasing sales/profits, and improving customer retention.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 8 depicts an illustrative backend interface for reviewing order, according to an exemplary embodiment of the disclosure.

FIG. 11 depicts an illustrative backend interface for customizing appointment and notification settings, according to an exemplary embodiment of the disclosure.

FIG. 15 depicts an illustrative backend interface for managing employees, according to an exemplary embodiment of the disclosure.

FIG. 16 depicts an illustrative backend interface for managing employee information, according to an exemplary embodiment of the disclosure.

FIG. 17 depicts an illustrative backend interface for managing employee schedules, according to an exemplary embodiment of the disclosure.

FIG. 19 depicts an illustrative backend interface for managing employee history, according to an exemplary embodiment of the disclosure.

FIG. 20 depicts an illustrative backend interface of various access levels, according to an exemplary embodiment of the disclosure.

FIG. 21 depicts an illustrative backend interface of various access levels, according to an exemplary embodiment of the disclosure.

FIG. 22 depicts an illustrative backend interface for managing specials/promotions/coupons, according to an exemplary embodiment of the disclosure.

DETAILED DESCRIPTION OF EMBODIMENTS

Exemplary embodiments may provide a system and method for providing web-based management solutions. That is, exemplary embodiments may, among other things, expand and optimize business and marketing by comprehensively and effectively providing web-based management solutions (e.g., booking reservations, customer/employee/ inventory management, payments, marketing, etc.) for any organization that provide time-dependent services.

Spas and spa-related services are becoming increasingly popular. In fact, there may be a variety of different spas and salons tailored to the preferences of each customer. For example, these may include resort/hotel spas, destination spas, casino spas, club spas, cruise ship spas, mineral springs spas, medical/dental spas, connoisseur spas, day spas, beauty salons, and spa lifestyle real estate. Whatever the choice, a first-time spa-goer or a seasoned spa-goer may be able to enjoy a short or long escape from the busyness of life and enhance overall well-being through professional services that encourage the renewal of mind, body, and spirit.

However, as discussed above, current systems may fail to provide comprehensive and effective web-based management solutions. Thus, embodiments of the present disclosure may provide a management solution that utilizes a centralized system for booking appointments, managing employees/customers, integrating point-of-sale services, attracting new customers, gaining customer confidence, and improving customer retention. Embodiments of the present disclosure may also provide a business solution that maximizes sales/profits by using an integrated fee transaction process between banks and merchant card processors.

Reference will now be made in detail to exemplary embodiments, examples of which are illustrated in the accompanying drawings. It should be appreciated that the same reference numbers will be used throughout the drawings to refer to the same or like parts. It should be appreciated that the following detailed descriptions are exemplary and explanatory only and are not restrictive.

It should be appreciated that the exemplary systems and methods are discussed in terms of "spas" and/or "spa-related" products/services. It should also be appreciated that as used herein, a "spa" or "spa-related" may refer to any type of health and beauty services. For example, these may include products/services related to health, medicine, skin, hair, nail, cosmetics, and other similar products/services. In addition, these may include salon or salon-related products/services. Other various embodiments may also be provided.

Figure 1:
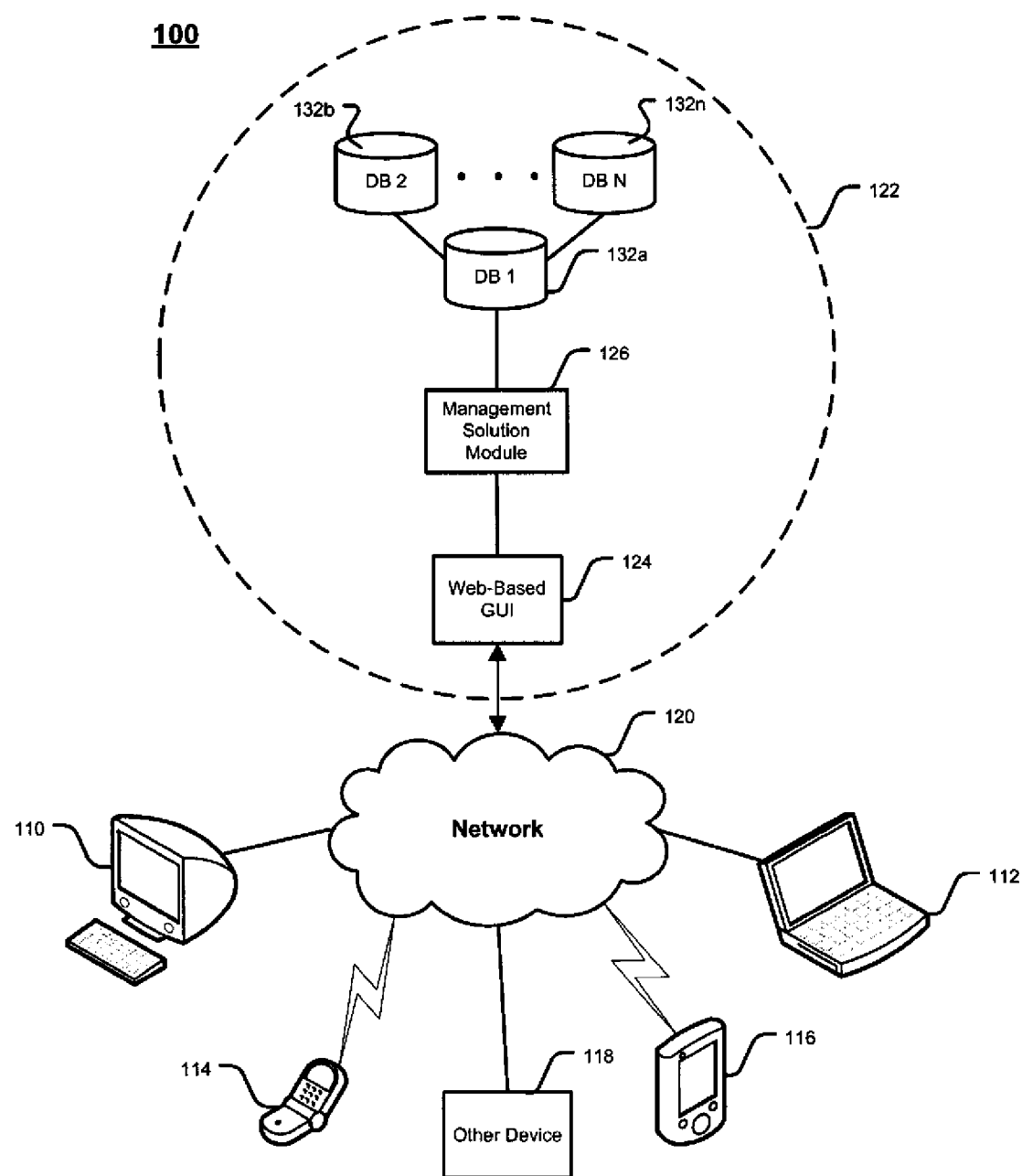
FIG. 1 depicts an illustration of a system architecture for providing web-based management solutions, according to an exemplary embodiment of the disclosure.

FIG. 1 depicts an illustration of a system architecture for providing management solutions, according to an exemplary embodiment. It should be appreciated that system 100 is a simplified view for providing management solutions and may include additional elements that are not depicted. As illustrated, the system 100 may comprise a user interface device from which a user, such as a partner (e.g., spa) or a customer (e.g., potential spa-goer), may connect to a Management Solution System 122 via a network 120.

The user interface device may include a computer 110, a laptop/notebook 112, a mobile phone, a personal data assistant (PDA) 116, or other similar device 118, such as a server or server-like system, a module, a smart phone, a wireline phone, a satellite phone, etc. Although a user interface device may typically be directed to those having computing or communication capability, it should be appreciated that other various systems/devices may also be used. These may include MP3 players, video players, personal media players, personal video recorders (PVR), watches, gaming consoles/devices, navigation devices, televisions, printers, and/or other devices capable of receiving and/or transmitting signals. It should be appreciated that the communications device/system may be mobile, handheld, or stationary. It should also be appreciated that the communications device/system may be used independently or may be used as an integrated component in another device and/or system. Other various embodiments may also be realized.

The user interface device may connect to the network 120 in a variety of ways, such as via wired or wireless broadband connection. In one embodiment, wired broadband connection may include long-range optical data communications, local area network based protocols, wide area networks, and/or other similar applications. In another embodiment, wireless broadband connection may include long-range wireless radio, local area wireless network such as 802.11 based protocols, wireless wide area network such as WiMax, and/or other similar applications. For example, communication between the various components of system 100 may be achieved via transmission of electric, electromagnetic, optical, and/or wireless signals and/or packets that carry digital data streams using a standard telecommunications protocol and/or a standard networking protocol. These may include modem dial-up, Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, etc., or via protocols for a wired connection, such as an IEEE Ethernet 802.3. Other various embodiments may also be provided.

The network 120 may be any network, such as a local area network (LAN), a wide area network (WAN), a service provider network, the Internet/World Wide Web, or other similar network, or a combination thereof. It should be appreciated that the network may use electric, electromagnetic, and/or optical signals that carry digital data streams.

The Management Solution System 122 may include a network-based user interface, such as a web-based Graphic User Interface (GUI) 124, from which a user interface device may connect via the network 120. The web-based GUI 124 may be communicatively coupled to a Management Solution Module 126. The Management Solution Module 126 may also be communicatively coupled to one or more databases (e.g., DB1 132a, DB2 132b, and DBN 132n, where N may represent any number). While shown as separate databases, it should be appreciated that the contents of these databases, as depicted in FIG. 1, may be combined into fewer or greater numbers of databases and may be stored on one or more data storage systems. Other data and/or information may also be stored and/or obtained from these databases. Other variations and/or components may also be provided.

It should be appreciated that the architecture of system 100 may have various embodiments. For example, not all system components may be within the Management Solution System 122. Instead, one or more components, servers, devices, and/or databases of the system 100 may be local or remote to the Management Solution System 122. It should also be appreciated that the Management Solution System 122 may be duplicated and/or maintained at various locations. Other various embodiments may also be realized.

The Management Solution Module 126 may be the central processing logic of the Management Solution System 122.

The Management Solution Module 126 may include one or more processors or processing logic (e.g., modules) to manage various business functions and features, such as processing orders, reserving appointments, scheduling employee/customer schedules, coordinating billing and receiving payments, managing payroll, etc. For example, a Management Solution Module 126 may display these features to a partner and/or customer at a user interface device.

While one configuration is shown in FIG. 1, it should be appreciated by one of ordinary skill in the art that other configurations of these various modules may also be possible. For example, in one embodiment, for ubiquitous accessibility, the Management Solution System 122 may be implemented as a web-based module by utilizing a 3-tier architecture. The first tier may represent a user interface tier that includes, for example, the web-based GUI 124. The second tier may include the business logic tier that includes, for example, the Management Solution Module 126. The third tier may represent a database tier that includes, for example, DB1 132*a*, DB2 132*b*, and DBN 132*n*, or other similar database. Other various configurations and designs may also be realized. In another embodiment, the Management Solution Module 126 of the Management Solutions System 122 may be comprised of several modules or may be coupled to one or more additional modules, each configured to perform a feature/function of the system 100. For example, the Management Solution Module 1216 may be coupled to a Reporting Module to generate custom reports, an Employee Management Module to manage employees (e.g., employee information, specialties, billing rates, schedules, payroll, etc.), a Facilities Management Module to manage availability of rooms or spa facilities, etc. Other various embodiments may also be realized.

In one embodiment, for example, a partner (e.g., a spa) may access the Management Solution System 122 via a user interface device to input various information. This information may be related to the partner (e.g., the spa, history of the spa, location, hours, services/treatments offered, deals, products, room availability, etc.), employee/technician information (e.g., personal information of an massage therapist employed by the partner other employee information, such weekly/monthly schedule, specialties and/or services, etc.), and other related information. Having all this information centralized, the Management Solution System 122 may provide a comprehensive system tailored and customized to each participating partner and its needs (e.g., booking reservations, etc.). Such a system may eliminate (or reduce) a need to synchronize various calendar information on various systems and therefore provide a secure and efficient way to manage appointments for participating partners. The Management Solution System 122 may include additional features/functions as well. These may include employee management, customer management, facilities management, product bundling, specials/promotions creation, point-of-sale services, etc.

In one example, a customer/user (e.g., a spa-goer) may access the Management Solution System 122 via a user interface device to view various "Day Spas" in his or her neighborhood, ratings of these spas, services, prices, availability, etc. The customer may interact with the Management Solution Module 126, via the web-based GUI 124, to select and build a personal/custom spa package from one or more partners.

Figure 2:
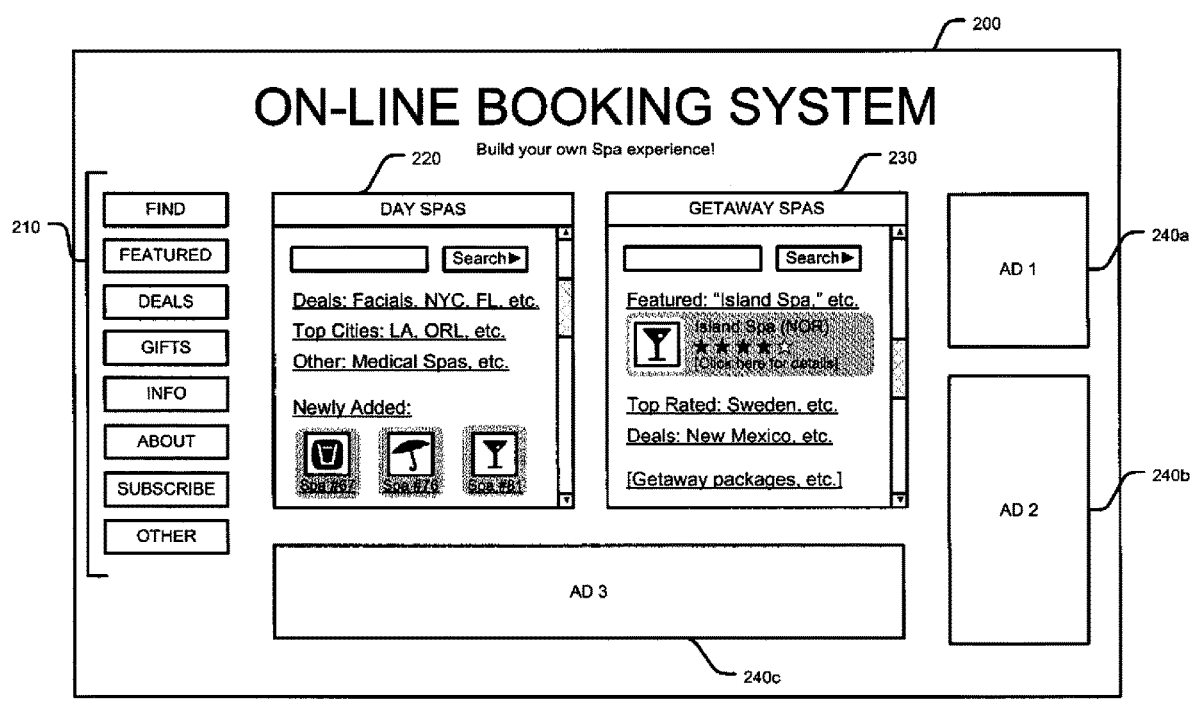
FIG. 2 depicts an illustrative interface for providing booking management solutions, according to an exemplary embodiment of the disclosure.

For example, a catalog of products, services, and/or popular products/services may be displayed by the Management Solution System 122, e.g., via an item presentation module, in which one or more user criteria may be entered/linked and received. FIG. 2 depicts an illustrative interface for providing web-based booking management solutions, according to an exemplary embodiment of the disclosure. In this example, an on-line booking system site 200 may be provided. The on-line booking system site 200 may include a listing/menu of links 210, a catalog of items (e.g., products and/or services, such as "Day Spas" 220, "Getaway Spas" 230, etc.), and one or more advertisements (e.g., AD 1, AD 2, AD 3, etc.). The listing/menu of links 310 may include various links to additional data. For example, link 210 may include links to "find" various spas, to see "featured" spas, to see the most recent "deals," to browse available "gift" options, to learn more "info," to learn "about" spas, to "subscribe" to one or more newsletters, and or "other" various links. The "Day Spas" 220 and "Getaway Spas" 230 may provide various products and/or services offered by the Management Solution System 122 from various partners. One or more advertisements may be presented to target customers in order to generate more business and/or profits. Other various configurations/embodiments may also be provided.

It should be appreciated that for each of the items presented in the on-line booking system site 200, a user may enter criteria for one or more items by clicking a radio button, selecting a link, and/or filling one or more fields for a search. It should also be appreciated that user criteria may not necessarily be inputted. For example, in one embodiment, user criteria may be information automatically generated. For instance, when a customer logs into a personalized account, his or her profile may be automatically pulled and the one or more items received may be based on this profile. These may include his or her transaction history, preferences, purchases, browsing habits, survey results, etc. It should be appreciated that the profile information may also be used to present recommendations, specials, promotions, deals, and/or discounts tailored to the customer. In another embodiment, user criteria may be based on one or more surveys. For example, a user may have previously submitted responses to one or more surveys and the system 100 may receive items based on these responses. In yet another embodiment, user criteria may be information/data received from a variety of other sources, such as targeted emailers, previous merchant affiliations, recommendations of people who know the user, etc. Thus, user criteria may be based on user input and/or other sources. Other various embodiments may also be realized.

When one or more items are identified (e.g., either by user input or other way), the user may also scroll up and down each category to find the items desired to be included in the site 200. In one embodiment, for example, a user may use a search feature to specify and/or narrow a search for a particular product and/or service. For example, a user may enter a partner name (e.g., name of spa), location (e.g., zip code, address, county, country, etc.), season, price range, and/or product/service (e.g., spa treatment, etc.). In another embodiment, a detailed description of each item may also be provided via hyperlink, mouseover, or other similar feature. Other various embodiments may also be provided.

Figure 3:
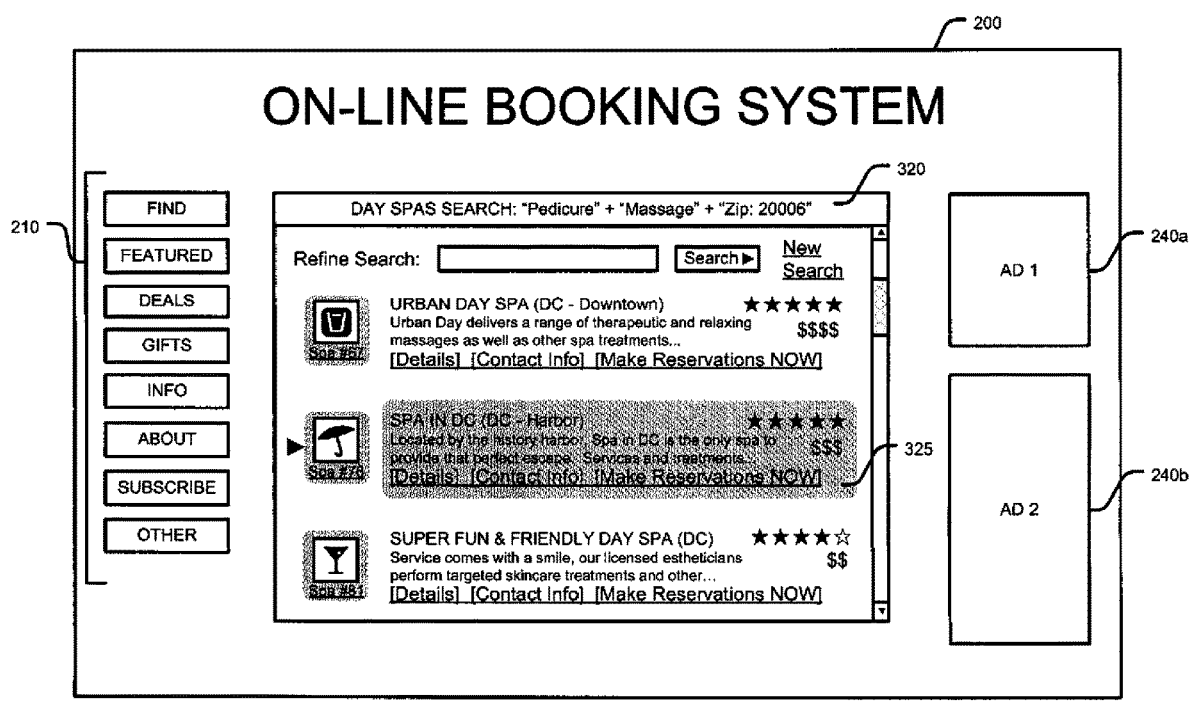
FIG. 3 depicts an illustrative interface for ordering a package, according to an exemplary embodiment of the disclosure.

Here, the Management Solution System 122 may then display the one or more items (e.g., products and/or services) for user selection. FIG. 3 depicts an illustrative interface for ordering a package, according to an exemplary embodiment of the disclosure. In this example, the screenshot may provide an on-line booking system site 200 including a list of one or more items 320 based on user criteria and/or other data. For instance, a user may have entered the following criteria "pedicure," "massage," and "20006" to yield the list of one or more spas 320. Similar to FIG. 2, the user may scroll up and down to find a desired product and/or service. Here, the user may see several spas that fit his or her search criteria: "Urban Day Spa," "Spa in DC," "Super Fun Day Spa," etc. Each item listed may have a name of the partner, a rating (e.g., star or other similar mark), brief description, and/or one or more links for more information. Other various embodiments may also be provided.

The Management Solution System 122 may receive one or more user selections to form a spa sales package. It should be appreciated that the customer may directly or indirectly build a spa package. For example, in one embodiment, the Management Solution Module 126 may present information (e.g., telephone number, email, website, etc.) of one or more partners so that a customer may contact a desired partner and build a spa package with that information. In this example, an employee of the partner may receive the order and enter information into the Management Solution System 122, may view and select from a various employees, timeslots, treatments/services, products, etc., and order the package for the customer.

In another embodiment, the customer may directly form and order a package from the on-line booking system 200. For example, referring back to FIG. 3, the "Spa in DC" may be highlighted 325 and may be selected by the user to begin the on-line process to order one or more products and/or services from the partner through the Management Solution System 122. For instance, the customer may click on "Make reservations" at the on-line booking system 200. Once the customer selects this option, a reservation window for Spa in DC may be presented to the customer.

Figure 4:
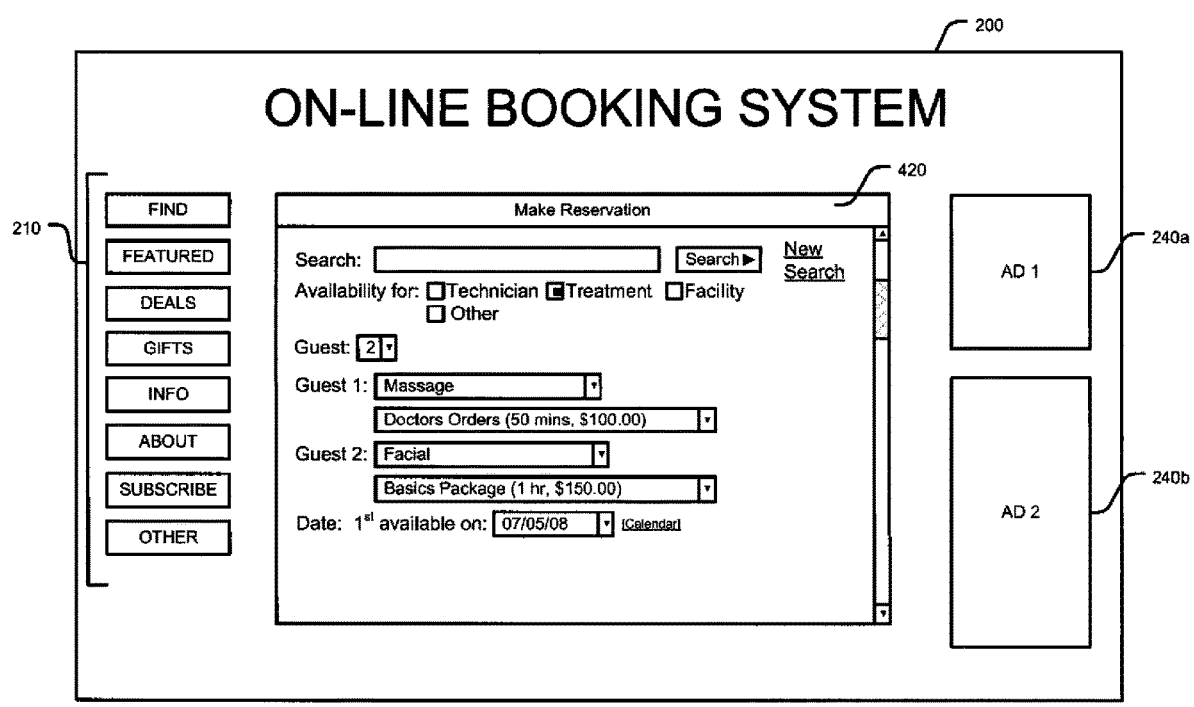
FIG. 4 depicts an illustrative interface for booking a reservation, according to an exemplary embodiment of the disclosure.

FIG. 4 depicts an illustrative interface for booking a reservation, according to an exemplary embodiment of the disclosure. In this example, a "Make Reservation" window 420 may be presented to the customer. In this window 420, the customer may be presented the ability to make a reservation/appointment by searching for availability of a technician/specialist (e.g., an employee of the participating partner), treatment/service, facility, or other category. It should also be appreciated that the customer may make the reservation/appointment for more than one party. For example, as depicted in the reservation window 420, the customer may make a reservation/appointment for two or more "guests." Here, a "Doctor's Orders" massage may be selected for "Guest 1," and a "Basics Package" facial may be selected for "Guest 2." A date of "07/05/08" may also be selected. It should be appreciated that a variety of other functions and features may also be provided, such as additional availability search features, etc.

Figure 5:
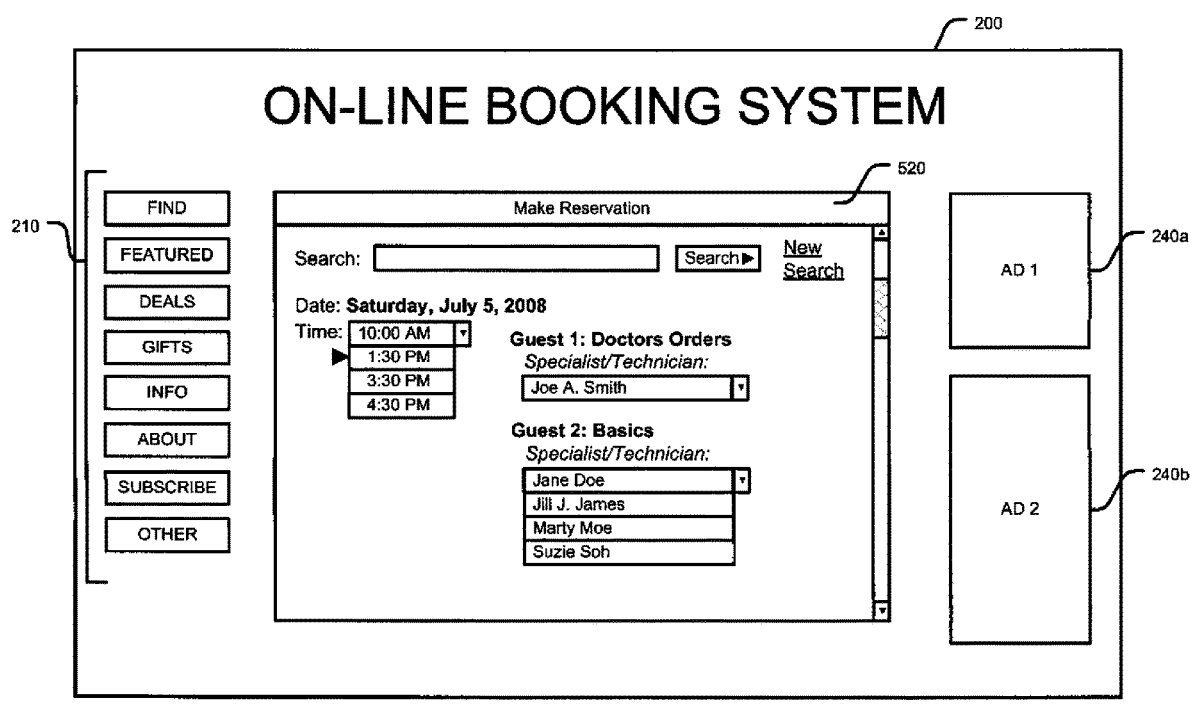
FIG. 5 depicts an illustrative interface for booking a reservation, according to an exemplary embodiment of the disclosure.

Once the customer enters these user selections, availability based on these selections may be processed and/or additional information may be requested. For example, FIG. 5 depicts an illustrative interface for booking a reservation, according to an exemplary embodiment of the disclosure. Here, the user selections provided by the customer have been processed and the on-line booking system 200 may provide a reservations window 520 with additional user selections, such as time and specialist/technician selections. In this example, the customer may select "1:30 PM" from a list of available times. In addition, the customer may select "Joe A. Smith" for the "Doctor's Orders" massage and "Jane Doe" for the facial. It should be appreciated that all the available time slots and/or specialists/technicians may be based on previously entered information. It should be appreciated that other variations may also be provided. For example, the customer may have started by selecting the specialist/technician, room/facilities at the spa, available date/time slots, etc. For example, Joe A. Smith may be a top-rated masseur for "Spa in DC." His profile, gender, schedule, specialties, and other information (e.g., freelancer, check/credit/cash payment, and other similar data) may be stored in the database so that a customer looking for these qualifications may be able to locate Joe A. Smith (if available). Other various embodiments may also be realized.

Figure 6:
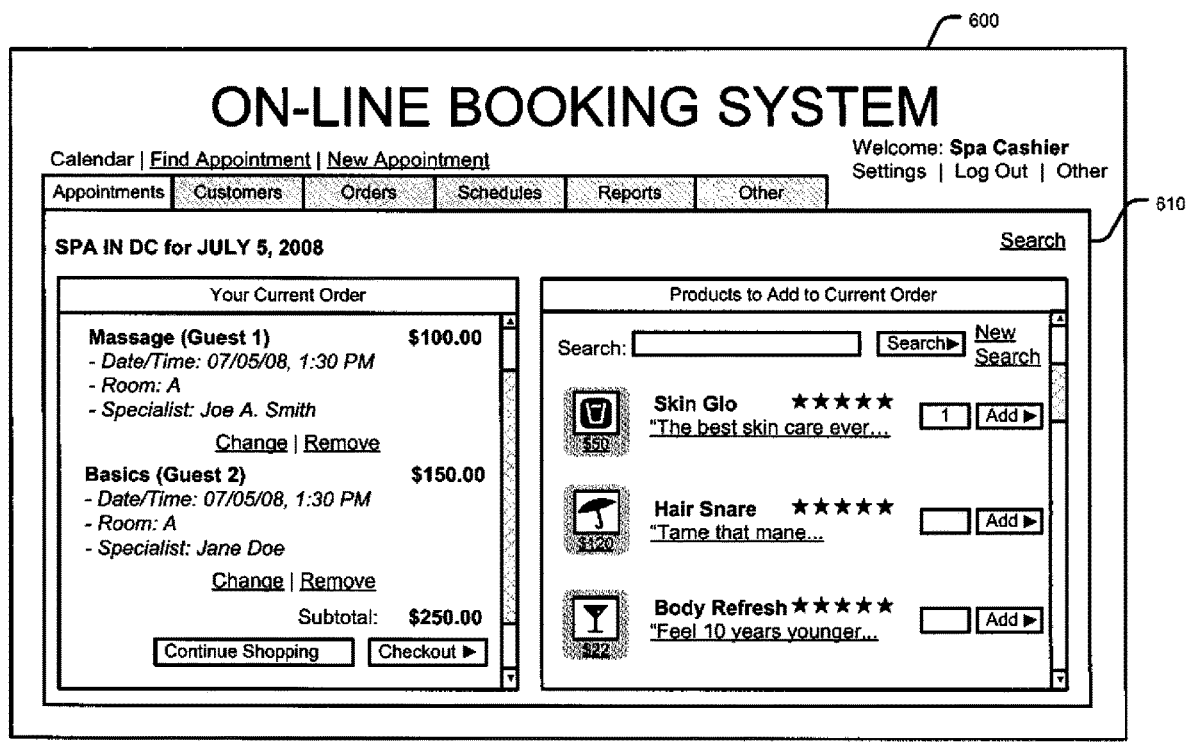
FIG. 6 depicts an illustrative interface providing integrated point-of-sale services, according to an exemplary embodiment of the disclosure.

Once these additional user selections are entered, the one or more reservations may be processed by the Management Solutions System 122. It should be appreciated that point-of-sale services may also be provided. In addition to booking appointments, the centralized Management Solution System 122 may provide point-of-sale services where various products/items may also be purchased. Similar to the way reservations are booked, a customer may directly access the on-line system to identify one or more items/products (e.g., lotions, gift certificates, massage stones, etc.) to include in his/her spa sales package or may have an employee (e.g., receptionist, sales clerk, etc.) of a participating partner take the order for the customer through the on-line system. For example, FIG. 6 depicts an illustrative backend interface 600 providing integrated point-of-sale services, according to an exemplary embodiment of the disclosure. In this example, a "spa cashier" (e.g., employee of the spa) taking this order from the customer may also offer various products for sale to the customer from an appointments window 610 on the backend interface 600. Here, the spa cashier may view the current customer order and choose from a list of spa-offered products directly from the appointments window 610 at the backend interface 600 of the on-line booking system, as depicted in FIG. 6. It should be appreciated that a catalog of products, services, and/or popular products/services may be displayed. For example, as depicted in FIG. 6, the customer may choose from a variety of products, such as "Skin Glo," "Hair Snare," "Body Refresh," etc. Here, the quantity may be specified and additional product search may be provided as well. Although depicted from a backend interface perspective, it should be appreciated that point-of-sale services may also be provided via the on-line booking system 200 with which the customer may interact.

Figure 7:
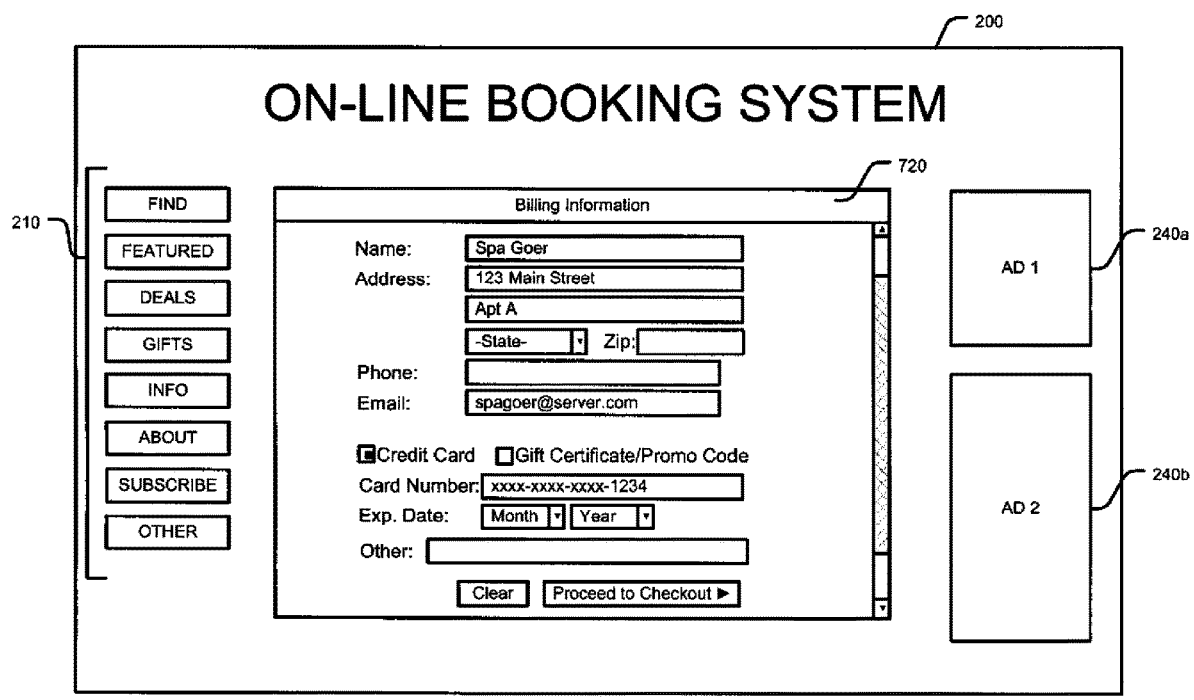
FIG. 7 depicts an illustrative interface for collecting billing/payment information, according to an exemplary embodiment of the disclosure.

Once the spa package is formed, the customer may begin to process payment for the package. FIG. 7 depicts an illustrative interface for collecting billing/payment information, according to an exemplary embodiment of the disclosure. In this example, a customer may be presented a billing information window 720 at the on-line booking system 200. Here, the billing information window 720 may allow the customer to enter his/her billing information, such as name, address, telephone number, email address, credit card information, etc. It should be appreciated that in the event the customer has previously setup a customer profile, this information may be automatically filled/entered for the customer.

Figure 8:
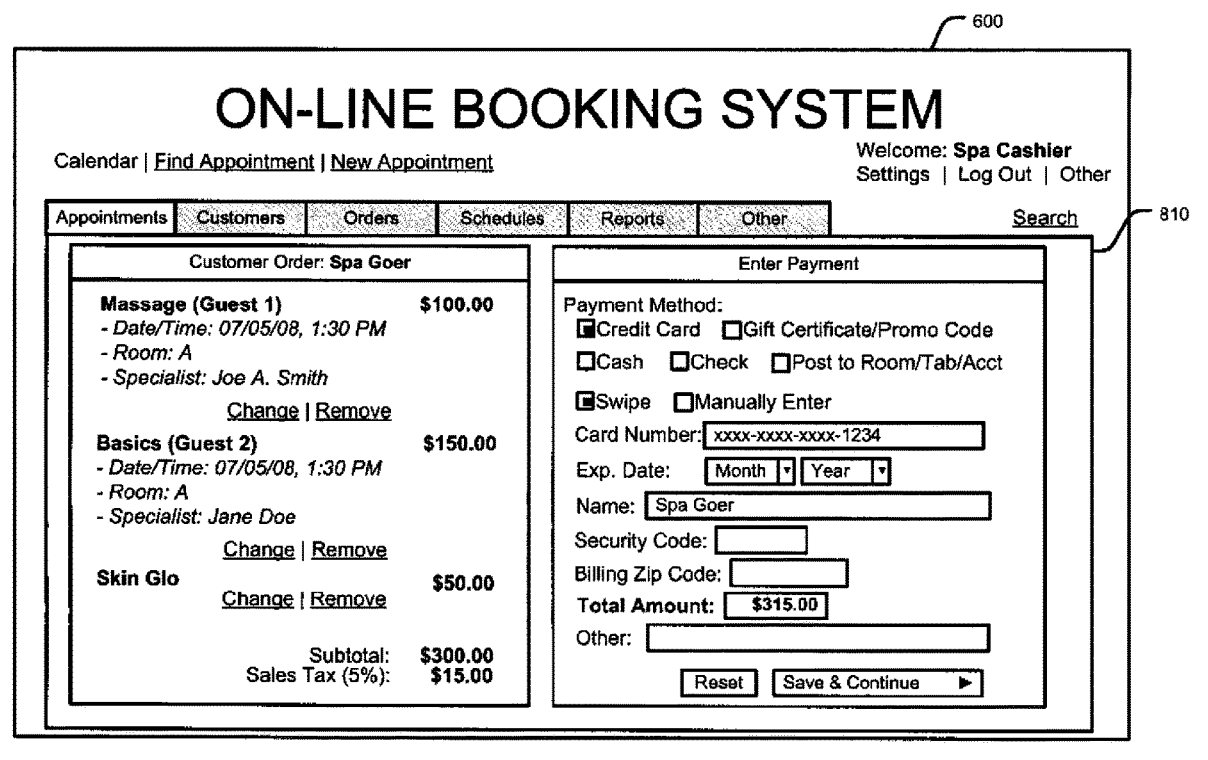

Similar to FIG. 6, in the event that the customer is finalizing his/her order through an employee (e.g., sales clerk or cashier) of the partner spa, the spa cashier may use the on-line system from a backend side to review and process the customer's order package. For example, FIG. 8 depicts an illustrative backend interface for reviewing orders, according to an exemplary embodiment of the disclosure. In this example, the order package formed by the customer (e.g., "Spa Goer") may have a total price of "$315.00." Furthermore, in addition payment by credit card or gift certificate, the customer may also pay by "cash," "check," and/or "post to room/tab/account" (e.g., if the spa is associated to a hotel or other account carrier). In the event payment is made by credit card or other card, the cashier may swipe/scan/read the customer's credit card or enter the card manually. It should be appreciated that one or more hardware devices for swiping/scanning/reading such cards may be connected the user interface device to assist in performing these features/functions. Other various embodiments may also be realized.

It should also be appreciated that coupons/promotional discounts may also be submitted here. Gift certificates may be provided (e.g., sold) by and for use at the Management Solutions System 122. For example, in one embodiment, customers may purchase gift certificates useable for any of the participating partners associated with the system 100. The Management Solution Module 126 may coordinate with various partners so that the gift certificates may be universally applied to one or more orders associated with a participating partner. Such a feature may allow customers the option of using their gift certificates not only at one partner but from various partners at their choosing. This may also provide additional business opportunities and/or benefits. It should be appreciated that gift certificates issued by the system 100 may be customized and may be redeemable similar to cash. Other various embodiments may also be realized. This and other additional methods of payment may provide comprehensive service to customers an effective way to receive payment.

Figure 9:
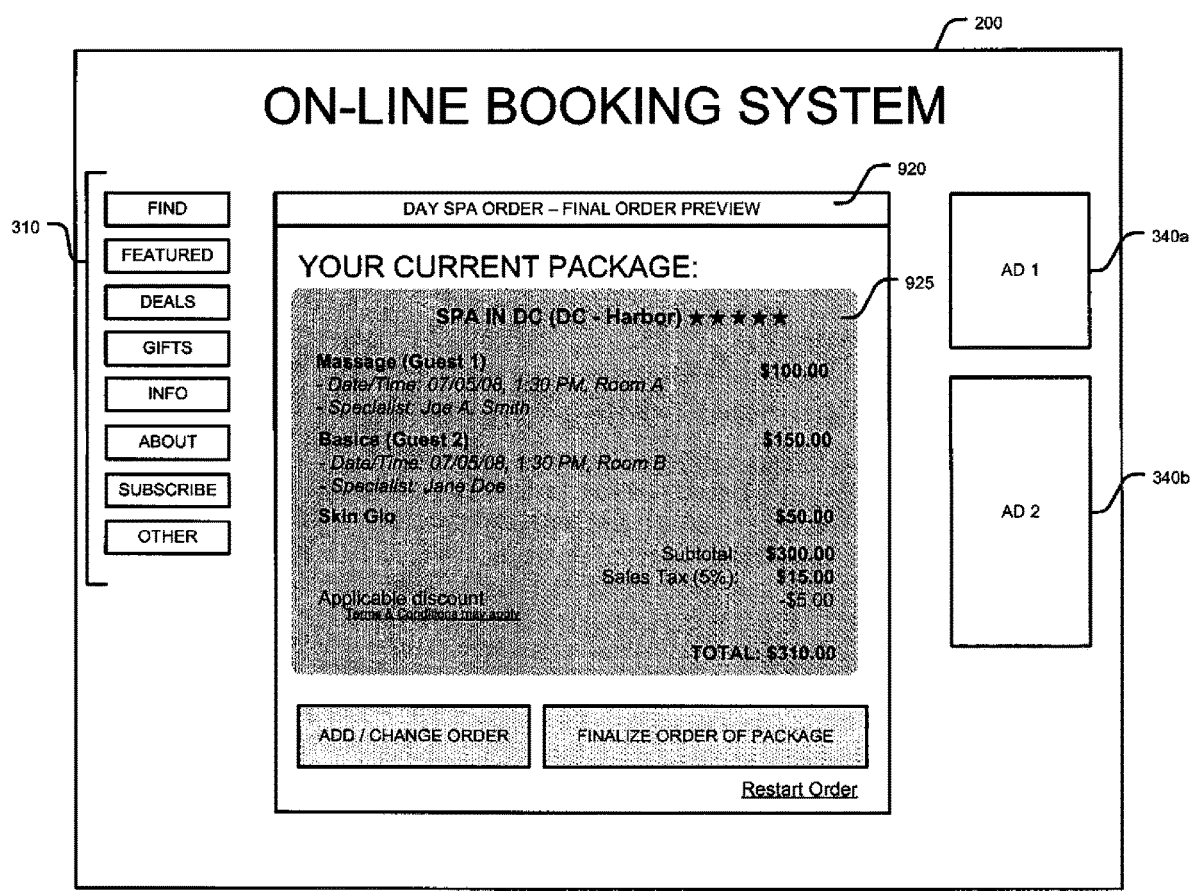
FIG. 9 depicts an illustrative interface for reviewing an order, according to an exemplary embodiment of the disclosure.

Once payment is accepted, an instant notification may be provided by the Management Solution System 122. For example, FIG. 9 depicts an illustrative interface for reviewing an order, according to an exemplary embodiment of the disclosure. In this example, the on-line booking system 200 may display an order review window 920, which may include the appointment location(s), caregiver(s), date(s)/time(s), price(s), calculated discount(s) (if any), associated terms and condition (if any), sales tax, and/or other similar information. The customer may review his or her options and decide, for example, whether to finalize the order, e.g., by selecting "Finalize Order of Package," add, change, decline, restart, and/or to perform other actions. In another embodiment, the customer may make additions and/or changes to the custom bundle. It should be appreciated that various display options and order features may also be provided.

Figure 10:
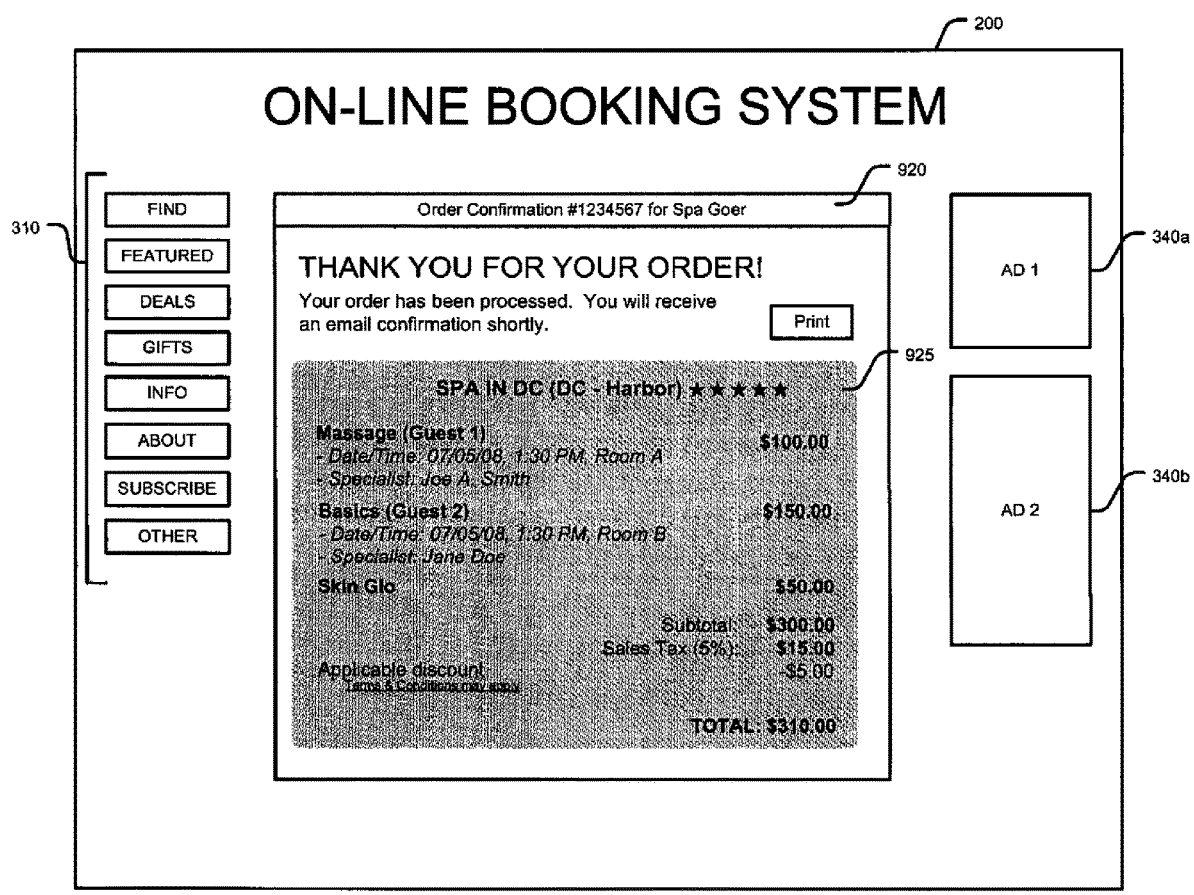
FIG. 10 depicts an illustrative interface of an order confirmation, according to an exemplary embodiment of the disclosure.

Once the order is finalized, the customer may receive a notification confirming the order and the reservations as well as a paper receipt in some cases. FIG. 10 depicts an illustrative interface of an order confirmation, according to an exemplary embodiment of the disclosure.

It should be appreciated that, in addition to the order confirmation, the Management Solution System 122 may also communicate with the partner and/or customer regarding a scheduled appointment and/or one or more orders. These may include various customizable notification alerts and/or messages (e.g., emails, text messages, voicemails, RSS, and/or other notification protocols). Changes, cancellations, and other requests may also be processed by the Management Solution System 122 in a real-time or near real-time manner. As a result, scheduling and reservations may be performed efficiently and accurately. Although the booking systems and methods may be operated mostly electronically and/or automatically, it should be appreciated that administrative oversight may be implemented to reduce error and optimize performance.

FIG. 11 depicts an illustrative backend interface for customizing appointment and notification settings, according to an exemplary embodiment of the disclosure. In this example, electronic notifications may be customized by a participating partner according to various settings. These may include email address, whether a customer may be able to reply or not, a reply email address, and/or other notification/appointment settings and related information. Although FIG. 11 depicts a "Spa Admin" customizing the settings, it should be appreciated that various levels of access and/or privileges may be afforded to others as well, such as the technician/specialist, receptionist, etc.

Figure 12:
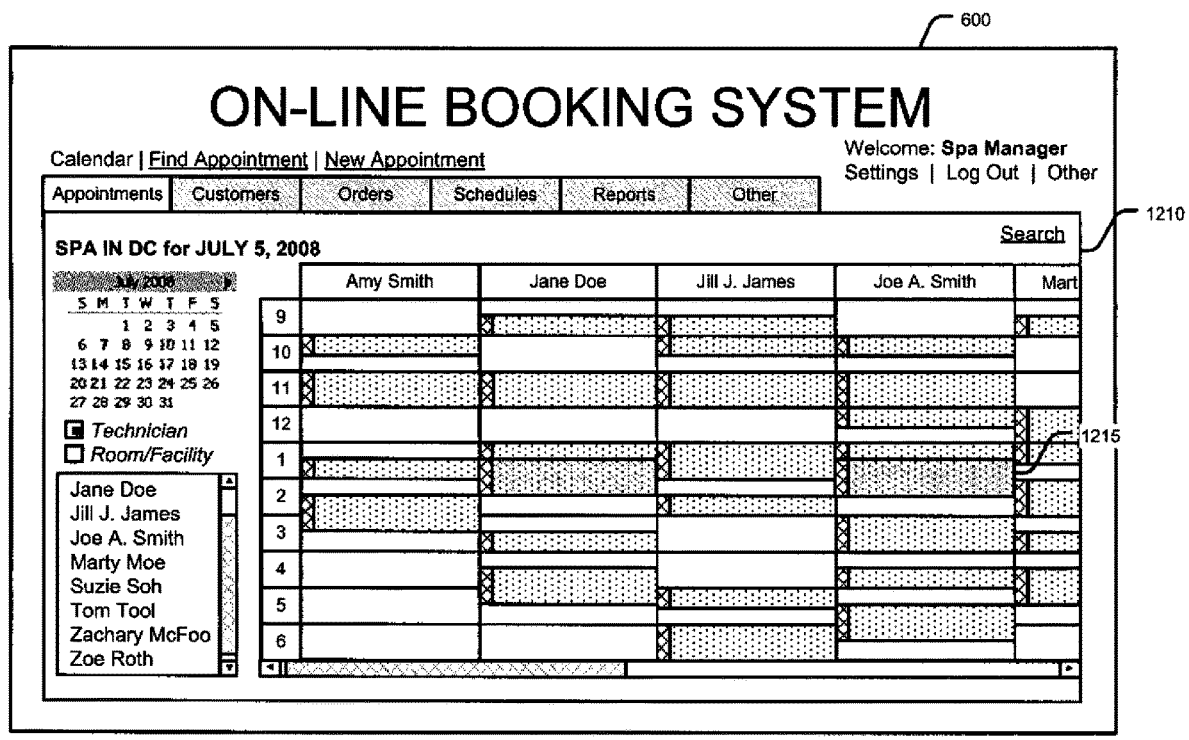
FIG. 12 depicts an illustrative backend interface for managing appointments, according to an exemplary embodiment of the disclosure.

FIG. 12 depicts an illustrative backend interface for managing appointments, according to an exemplary embodiment of the disclosure. In this example, the "Spa Manager" may view schedules of one or more employees of the participating partner (e.g., spa) in a singular calendar format 1210. Here, the calendar 1210 may present the reservations/appointments 1215 for the "guests" of "Spa Goer," as described above, under the schedules of "Jane Doe" and "Joe A. Smith." As depicted, in one embodiment, the calendar 1210 may be in a daily format. In another embodiment, a weekly, monthly, and/or other similar calendar format may also be presented.

It should be appreciated that various options may be provided to view the reservations/appointments. For example, a search/scroll feature may be implemented. Furthermore, it should be appreciated that in this backend interface 600, changing one or more reservations/appointments may be achieved by drag-and-drop capabilities, which may also be enabled by the Management Solutions System 122. Not only does this provide an easy way to edit/change reservations/appointments, but it also allows various users (e.g., partner manager, partner employee, customer, etc.) ability to customize their orders and/or reservations from one system. Accordingly, as discussed above, since the Management Solutions System 122 may be centralized, common reservation errors, such as double-booking, may be greatly reduced if not entirely eliminated. Other various appointment editing capabilities may also be provided.

Figure 13:
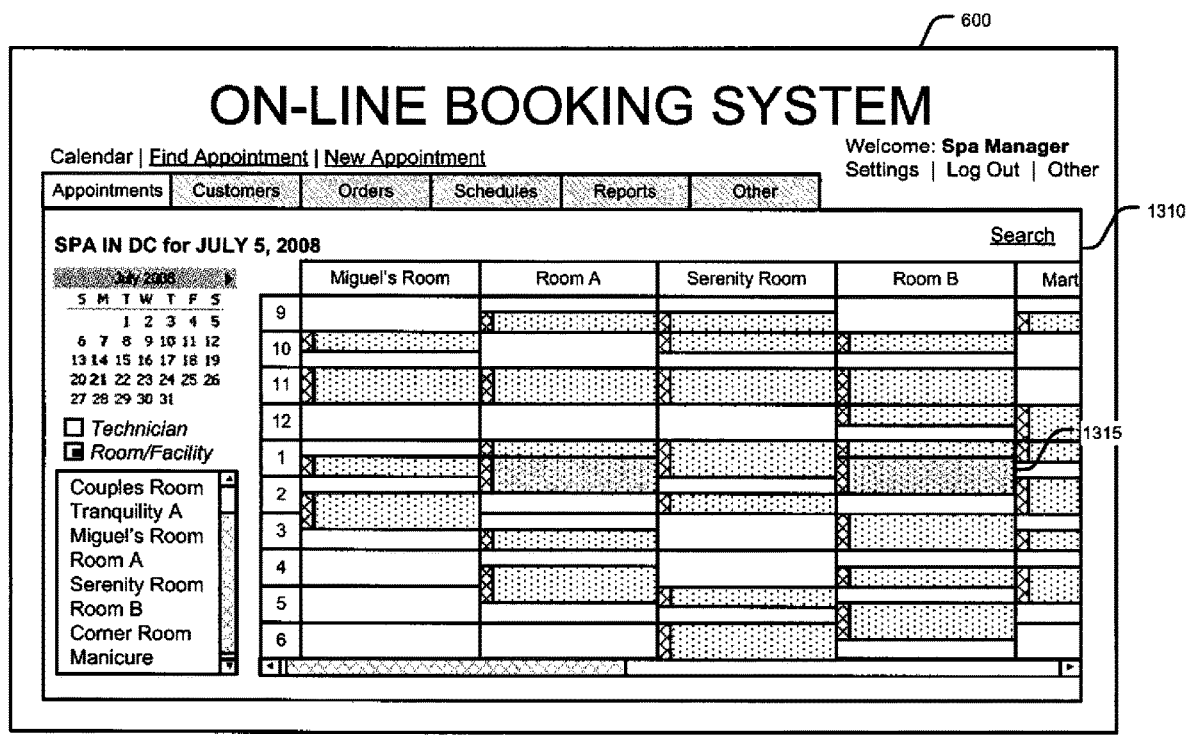
FIG. 13 depicts an illustrative backend interface for managing facilities, according to an exemplary embodiment of the disclosure.

It should be appreciated that the backend interface 600 of the Management Solutions System 122 may also allow reservation/appointment viewing in other formats. For example, FIG. 13 depicts an illustrative backend interface for managing facilities, according to an exemplary embodiment of the disclosure. Similar to FIG. 12, the backend interface 600 of FIG. 13 may present a calendar of reservations/appointments 1310 in one or more various calendar formats. However, unlike FIG. 12, the calendar 1310 may present appointments by viewing one or more facilities of the spa. For instance, the "Spa Manager" may view the availability of various rooms/facilities by searching and/or scrolling through the various rooms/facilities. Here, as depicted, the calendar 1310 may present the reservations/appointments 1315 for the "guests" of "Spa Goer" as booked time slots in "Room A" and "Room B." In this view, other rooms/facilities may also be presented, such as "Miguel's Room," "Serenity Room," etc.

It should be appreciated that various options may be provided to view the reservations/appointments. For example, a search/scroll feature may be implemented. Furthermore, it should be appreciated that in this backend interface 600, changing one or more reservations/appointments may be achieved by drag-and-drop capabilities, which are also enabled by the Management Solutions System 122.

It should be appreciated that this may be an important feature because certain rooms/facilities may be equipped for certain specialties/treatments. For example, a customer may purchase an aromatherapy service. Because aromatherapy uses volatile liquid plant materials, known as essential oils (EOs) and other aromatic compounds from plants for the purpose of affecting a person's mood or health, a specialized room may be requested to store these materials and/or perform such a service. In another example, a customer may purchase a Fijian sport massage, which uses feet rather than hands to perform the massage. Therefore, a Fijian sport massage technician (or other qualified employee) may use a special room to perform this service. Such a room may be equipped with balancing beams on the walls and/or ceiling to allow the technician to perform the massage with proper weight and/or balance. It should be appreciated that the databases of the Management Solution System 122 may store such room information (e.g., types of service it may be used for, availability, etc.) in order to provide better management of rooms and overall customer service.

Figure 14:
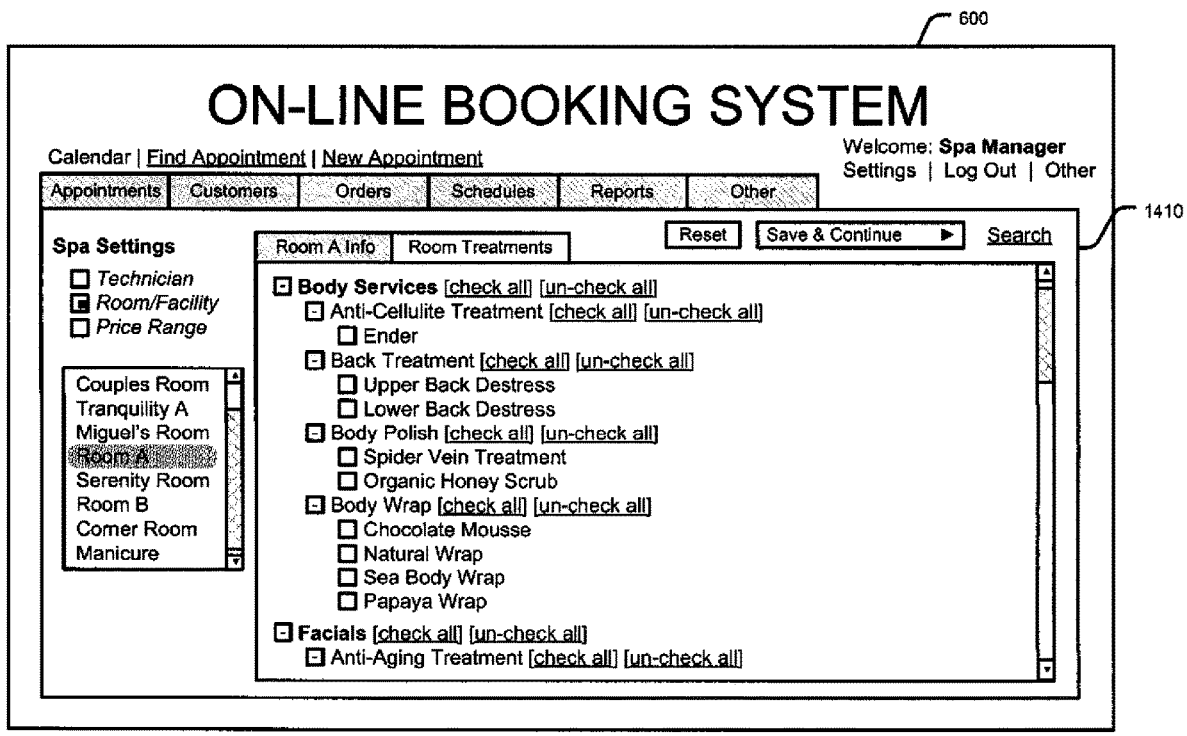
FIG. 14 depicts an illustrative backend interface for managing services, according to an exemplary embodiment of the disclosure.

FIG. 14 depicts an illustrative backend interface for managing services, according to an exemplary embodiment of the disclosure. In this example, the "Spa Manager" may manage, via the Management Solutions System 122, the various treatments/services offered by the partner at a particular room/facility, e.g., Room A. Here, Room A may be equipped to handle one or more treatments, such as body services (e.g., anti-cellulite treatment, back treatment, body polish, body wrap, facials, etc.). It should be appreciated that the various services depicted in FIG. 14 are merely exemplary and should not be construed limiting. Other various services/treatments/specialties may also be provided. Furthermore, it should be appreciated that in addition to managing services/treatments per room/facility, the "Spa Manager" may select the specialties/services/treatments it offers according to technician/specialist, price range, availability, necessary equipment, and/or other various categories.

With regard to information associated with scheduling (e.g., partner availability, facilities, employees, etc.), it should be appreciated that the Management Solution Module 126 may coordinate with the databases to determine available dates, ranges of dates, times, and/or ranges of time. It should also be appreciated that special rules/treatments may be applied to days in which a partner may be close or during holidays. For example, a first employee for a partner may have a message appointment scheduled in Room 1 at 1:00 PM that lasts for an hour until 2:00 PM. To consider adequate clean-up time, etc., the first employee may be scheduled as being out of service until 2:15 PM since it may take 10-15 minutes to turn over Room 1, which may be a larger room than Room 2, which may only take 5-10 minutes. Therefore, the system 100 may schedule an second employee who wanted to use Room 1 at 2:00 PM would not be allowed because the system 100 may recognize that the first employee may be turning the room over at that time. Accordingly, the Management Solution System 122 may have the processing logic to coordinate with the various components of the system 100, e.g., the databases, to ensure smooth and accurate calendar control and booking. Other various embodiments may also be realized.

Figure 15:
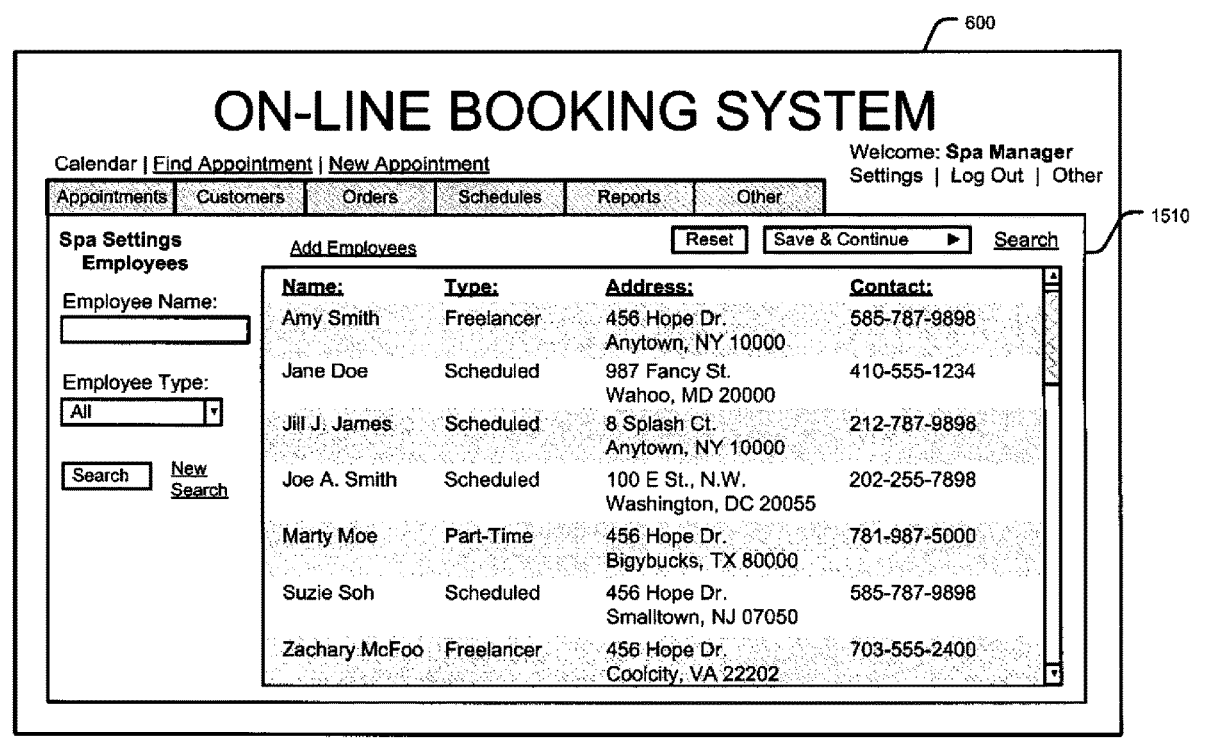

FIGS. 15 to 19 depict an illustrative backend interface for managing employees, according to exemplary embodiments of the disclosure. Referring to FIG. 15, for example, an illustrative backend interface 600 for managing employees according to an exemplary embodiment of the disclosure is shown. In this example, the participating partner may search one or more employees by name, type, and/or other search criteria in an employee management window 1510. Here, a list of all employees or those from the search may be presented. Specifically, the employees of the partner name be sort by name, type, address, contact information, schedule, availability, gender, etc. Other various embodiments may also be realized.

FIG. 16 depicts an illustrative backend interface 600 for managing employee information, according to an exemplary embodiment of the disclosure. In this example, the participating partner may manage an employee's personal information in an employee information management window 1610. These may include name, type, pay type, leave, contact information, bank account information (e.g., for direct deposit), payroll information, and/or other personal information.

Figure 17:
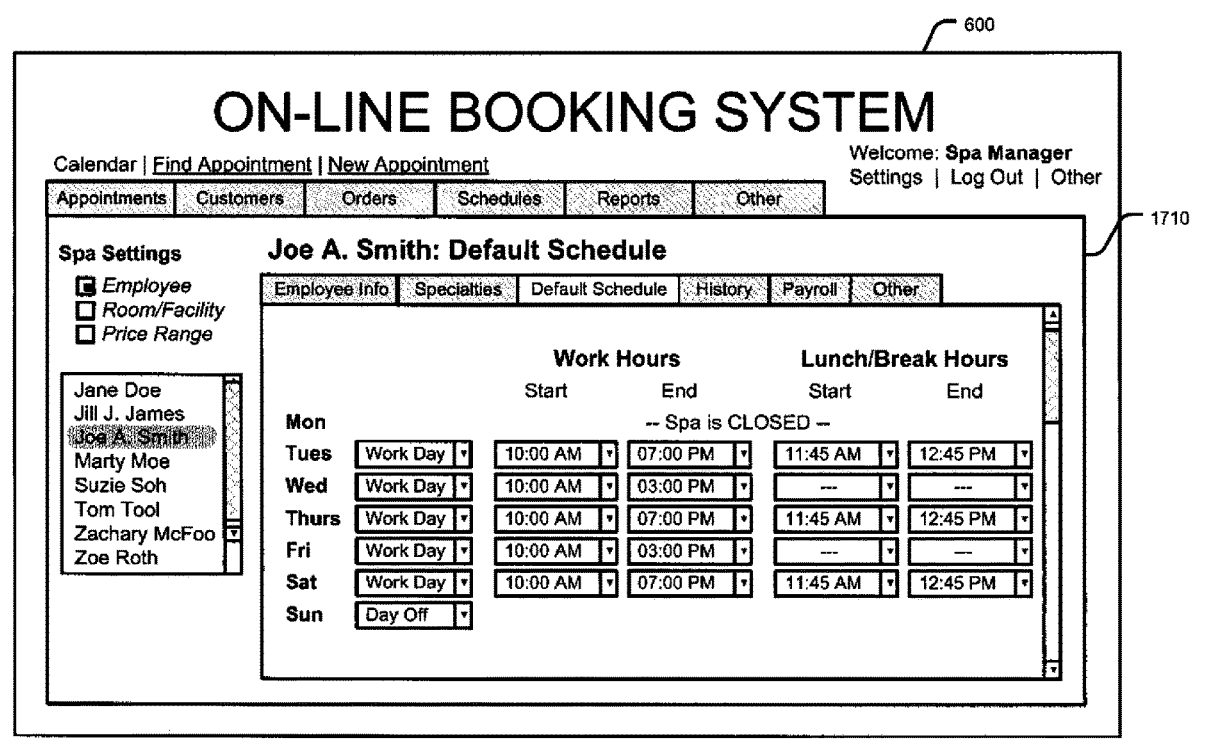

FIG. 17 depicts an illustrative backend interface 600 for managing employee schedules, according to an exemplary embodiment of the disclosure. In this example, a default schedule of an employee may be set or customized in an employee schedule window 1710. Here, weekly work hours may be set. Additionally, lunch, break times, and "off" days may also be configured. It should be appreciated that when the partner business is closed, the backend interface 600 may not permit entry of hours. It should be appreciated that the default schedule may be set by an administrator, manager, employee, and/or other scheduler, depending on how the partner configures the system 100. Other various embodiments may also be realized.

Figure 18:
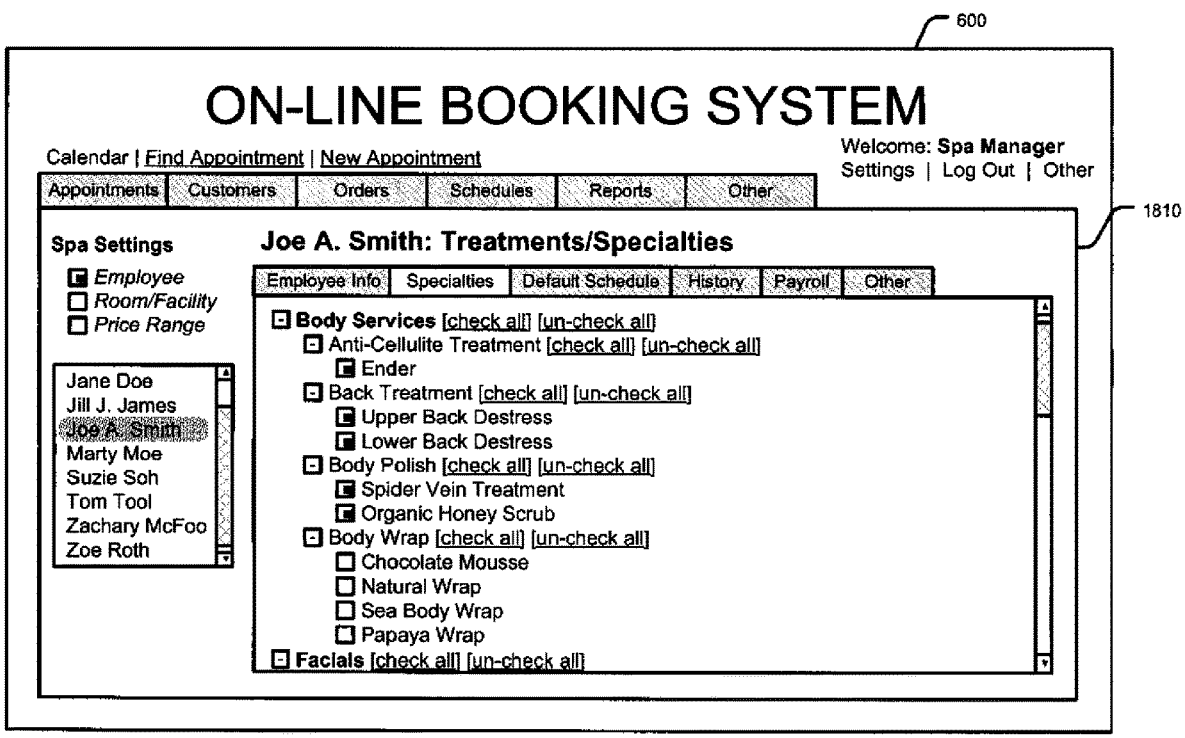
FIG. 18 depicts an illustrative backend interface for managing employee services, according to an exemplary embodiment of the disclosure.

FIG. 18 depicts an illustrative backend interface for managing employee services, according to an exemplary embodiment of the disclosure. In this example, specialties/treatments of an employee may be set or customized in a specialties/treatments window 1810. Here, similar to FIG. 14, the various treatments/services offered by a specific employee/specialist/technician of the partner, e.g., "Joe A. Smith" may be managed. Here, Joe A. Smith may be equipped to handle one or more treatments, such as body services (e.g., anti-cellulite treatment, back treatment, and body polish) but not others (e.g., body wrap, facials, etc.). It should be appreciated that the various services depicted in FIG. 18 are merely exemplary and should not be construed as limiting. Other various embodiments may also be realized.

FIG. 19 depicts an illustrative backend interface for managing employee history, according to an exemplary embodiment of the disclosure. In this example, history of an employee may be presented in an employee history window 1910. Here, various orders performed or to be performed may be presented. For example, the message ordered by "Spa Goer" for one of her guests may be represented as "Order No. 10004." The history window 1910 may also indicate the status, such as "checked-in," booked," "paid," "cancelled," or other status identifier. The history window 1910 may also present additional information such as customer/contact information, what facilities were scheduled to perform the order, date/time of the appointment, and/or other similar information. Presenting all this information in one view may allow partners the ability to review and analyze employee production and/or may allow employees to control and flexibility over their own clientele.

It should be appreciated that additional employee management features may be provided. For example, in one embodiment, a payroll system and method may be fully integrated with the system. This may allow participating partners to manage employees in a more comprehensive and effective way using one system, rather than several systems, which may be prone to error, etc. In another embodiment, a tiered billing system may be implemented so that various billing rates/fees for employees, specialists, and/or technicians may be managed. For example, employee may categorized in a variety of types, such as be full-time, part-time, scheduled, freelancer, owner, student, etc. Accordingly, each employee may have different billing rates/fees associated. Thus, a system and method to incorporate these aspects of management may also be important. In yet another embodiment, employee popularity may also be considered. For example, a massage therapist may be known in a particular region for her stone massages. Because of her popularity, she may draw in more business for the spa as a whole. In one sense, a system that is able to measure this may be extremely beneficial to the spa so that she may be properly compensated, in addition to creating a framework with which the spa may build/expand business. Other various embodiments may also be realized.

Thus, by centralizing employee information into one system (e.g., stored in the databases) may allows at least these management functions/features, which may provide a business model that is not only flexibility (e.g., accessible from various worksites), but also reduce errors (e.g., from synchronizing two or more systems having similar information) and increase efficiency.

It should also be appreciated that all or a limited amount of the information may be presented to the customer/user depending on the level of access. Such a feature may be customized by the partner at the Management Solution System 122. For example, FIGS. 20-21 depict an illustrative backend interface of various access levels, according to an exemplary embodiment of the disclosure. FIG. 20 depicts an illustrative backend interface 600 for a "Spa Manager" access level 2005, according to an exemplary embodiment of the disclosure. In this example, an edit user window 2010 may be presented. Here, the Spa Manager may be able to view some or all of the information of a user, including her contact information, email address, type of user (e.g., spa user), role (e.g., administrative, reporting, reservationist, technician, and/or other), username, password, etc. It should be appreciated that the Spa Manager may be able to edit the information corresponding to each user in this edit user window 2010 as desired. For example, "Spa Goer" may be assigned administrative privileges. FIG. 21 depicts an illustrative backend interface 600 for searching users and/or corresponding access levels, according to an exemplary embodiment of the disclosure. Here, one or more searches for user may be provided. In this case, search results may be presented, as depicted in the edit customer window 2110. Here, various users that match the search criteria may be presented. In addition, each users' name, roles (e.g., access level), username, when account created, and/or other features (e.g., edit, delete, etc.) may also be presented. Other various categories and/or edit features may also be provided. It should also be appreciated that depending on the role or access level of the user, the user may be limited in his editing capabilities. For example, "Joe S." has "technician" privileges which are different than that of "Spa Admin" who has "admin" privileges, who in turn has different privileges compared to that of "Shaka K.," who has a "reservationist" role. It should be appreciated that a participating partner may set one or more various access levels to the booking system, depending on its business needs. Other various embodiments may also be realized.

In one embodiment, a setup wizard may also be provided to provide these various levels of access. For example, initializing the system 100 may be a cumbersome task. However, using an integrated setup wizard may help transition from a business that uses several systems (e.g., web, cashier, payroll, scheduling, etc.) into a centralized Management Solutions System 122. Here, the partner may setup several levels of access so that security is not compromised. For example, an employee should not be able to tamper with her payroll information. However, a manager may be able to override pricing, schedules, customer information, etc. In another embodiment, administrator privileges may be provided to setup the various access levels of the system 100. Other various embodiments may also be provided.

It should also be appreciated that because information stored at the Management Solution System 122 may be highly private, a variety of additional security measures may also be utilized. For example, the system 100 may utilize various security features, such as SSL 128 bit security with Verisign issued certificates, etc. Furthermore, a redundant n-tier architectural structure may be implemented to reduce security breach, etc. Other various embodiments may also be realized, e.g., where systems may be compliant with one or more car association security guidelines (similar to Payment Card Industry (PCI) or Payment Application Best Practices (PABP) compliance), etc.

FIG. 22 depicts an illustrative backend interface for managing specials/promotions, according to an exemplary embodiment of the disclosure. In the event that there are not many appointments for a particular day, week, or month, the Management Solution System 122 may recognize this and collaborate with partners to generate special deals to serve existing customers. For example, the Management Solution System 122 may broadcast or publish one or more specials, deals, and/or coupons via email, text message, Real Simple Syndication (RSS), and/or other similar communication.

In one embodiment, the Management Solutions System 122 may automatically generate and/or manage specials/promotions according to the needs of the partner. For example, the Management Solutions System 122 may recognize that Mondays and Tuesdays are particular slow business days. As a result, one or more specials/promotions for use on Mondays and Tuesdays may be generated to bolster business. In another embodiment, it may be recognized that business is slower during a particular season of the year or during a particular time of day. Accordingly, the Management Solutions System 122 may also generate and/or manage specials/promotions to fit these time periods as well.

Although specials and/or promotions may be automatically generated and managed, it should be appreciated that a partner may also manually specify its needs as well and coordinate with the Management Solutions System 122 to form one or more specials/promotions. These products/services may be packaged as "top picks" or "featured items" to subsequent customers. These specials/promotions may also be used to promote customer loyalty, as well as attract new customers. Furthermore, not only would this optimize service to customers, it may also maximize sales and profits as well by maximizing schedules and resources.

Referring back to FIG. 22, for example, the backend interface 600 may also provide a specials settings window 2210. The specials window 2210 may allow a Spa Manager to search specials, specials codes, and or other specials criteria to view past, present, and/or future specials/promotions. The specials window 2210 may also allow the Spa Manage the ability to generate a new special or promotion, reuse a previous special, modify/update a special/promotion, etc. Here, each special may have a name (e.g., "Botox Loyalty Special, "Family & Friends," "Spring Hair Removal," etc.), a corresponding code, dates/times with which these specials may be used/applied, and a discount measured in at least one of a percentage, monetary unit, promotion, or combination deal. Other various embodiments may also be realized.

Figure 23:
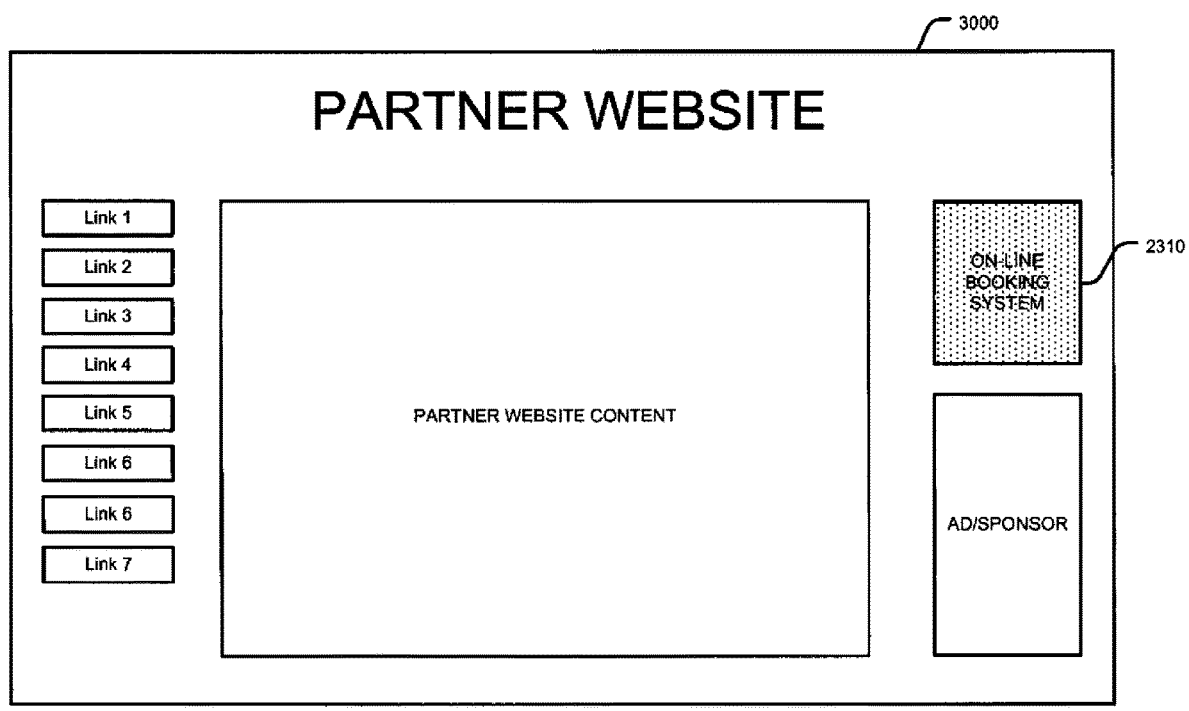
FIG. 23 depicts an illustrative interface for a management solution imbedded at a partner website, according to an exemplary embodiment of the disclosure.
Figure 24:
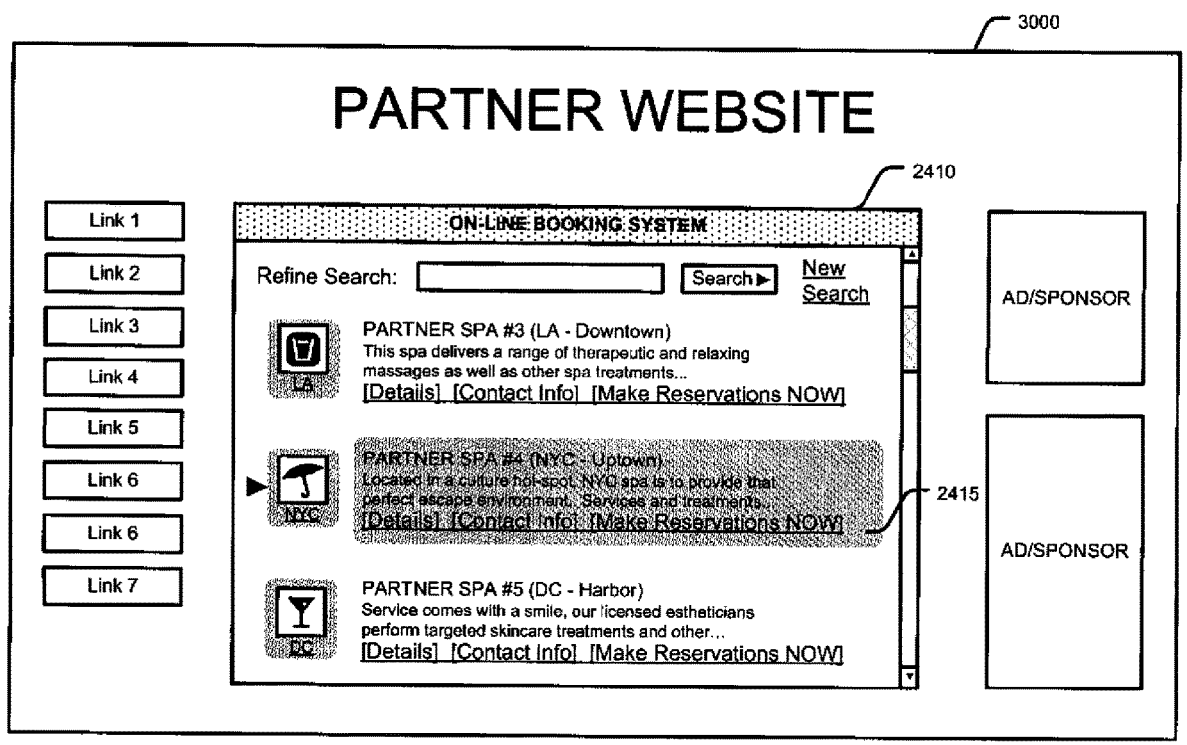
FIG. 24 depicts an illustrative interface for a management solution imbedded at a partner website, according to an exemplary embodiment of the disclosure.

It should be appreciated that the features of the Management Solution System may also be integrated into a partner's website to be accessed by customers and others. For example, FIG. 23 depicts an illustrative interface for a management solution imbedded at a partner website, according to an exemplary embodiment of the disclosure. In this example, a partner's website 3000 may present a link to an on-line booking system 2310. FIG. 24 depicts an illustrative interface for a management solution imbedded at a partner website, according to an exemplary embodiment of the disclosure. In this example, the partner website 3000 may present an imbedded link to the on-line booking system 2410. Similar to FIG. 3, a customer or visitor of the partner website 3000 may search for one or more spas owned by the partner, e.g., entering in the search field. For example, the customer may enter the following criteria "pedicure," "massage," and "20006" to yield the list of one or more spas in the on-line booking system window 2410. Here, as described above with respect to FIG. 3, the user may see several spas that fit his or her search criteria: "Urban Day Spa," "Spa in DC," "Super Fun Day Spa," etc. Each item listed may have a name of the partner, a rating (e.g., star or other similar mark), brief description, and/or one or more links for more information. Thus, this provides another flexible feature for customers to book reservations and/or order one or more products from a partner. Other various embodiments may also be provided.

By using a centralized system, which may be accessible to partners and/or clients over the network 120, appointments may be easily tracked and safeguarded from double-booking or other similar errors associated with systems that attempt to synchronize one booking system with another. Nevertheless, in the event such features may be important to partners and/or customers (e.g., initial setup of the system for participating partners), the Management Solution System 122 may electronically interact with partner-side and/or customer-side software to identify a scheduled appointment (e.g., in calendar programs such as Microsoft™ Outlook, LotusNotes,™ Apple™ iCal, Google™ Calendar, etc.). Other various embodiments may also be realized.

It should be appreciated that, in addition to scheduling/booking features, the system 100 may also provide additional functions. These may include inventory management, financial processing, and reporting options, etc.

For example, in one embodiment, the system 100 may also manage partner inventory, such as various products and/or items stored at one or more store locations and/or warehouses. In another embodiment, the system 100 may provide more in-depth financial processing in addition to payroll, billing rates, etc. These may include managing business debts, costs, overhead, and/or managing accounts receivables, etc. In yet another embodiment, the system 100 may generate customizable reports, which may assist participating partners in further developing business (e.g. generate repeat business and/or attract new clientele). For example, this information may include which products/services are most popular, total appointments within a specified time, price lists of various products/services, profiles of customers and/or partner technicians/employees, etc. Customizable reports may be provided in a variety of formats, such as Excel, HTML, PDF, XML, and other formats, etc.

According to another exemplary embodiment, a business solution that maximizes profits by using an integrated fee transaction process between banks and partners may also be provided. For example, a merchant account may be understood as a contract under which an acquiring bank extends a line of credit to a merchant who wishes to accept payment card transactions of a particular card association brand. Without such a contract, payments by any of the major credit card brands (e.g., VISA,™ MasterCard,™ etc.) may be not be accepted. In general, credit card transactions may be sent electronically to merchant processing bank for authorization, capture, and/or deposit. Although credit card processing varies from industry to industry, it should be appreciated that transactions may be achieved by swiping/scanning/reading a credit card through terminal/reader or manually entering the credit card information in to a credit card terminal, a computer, website, or similar component. As discussed above, swiping/scanning/reading a credit card may offer a lower rate, as compared to manual entry, because of the risks/errors involved with manual entry.

Figure 25:
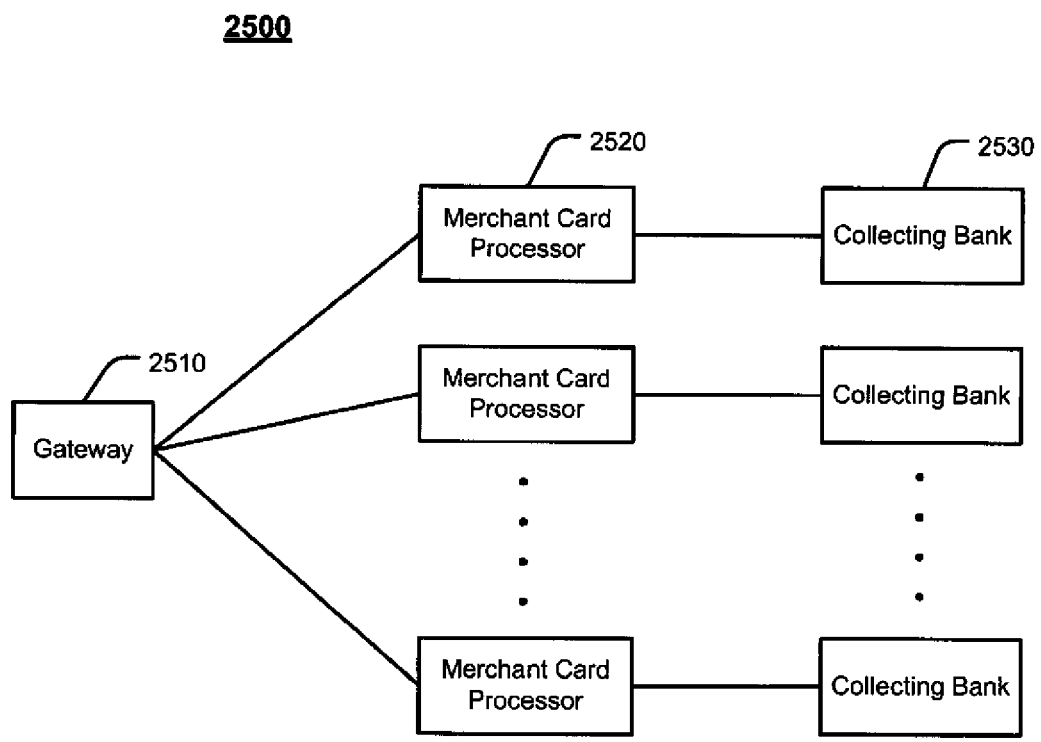
FIG. 25 depicts an illustration of a system architecture for processing transactions, according to an exemplary embodiment of the disclosure.

FIG. 25 depicts an illustration of a system architecture for processing transactions 2500, according to an exemplary embodiment of the disclosure. In this example, the system architecture 2500 may include a gateway 2510 connected to one or more merchant card processors 2520, which in turn may also be connected to one or more collecting banks 2530.

The gateway 2510 may be a payment gateway, which may be an e-commerce service that authorizes payments for e-commerce and/or online retailers. In other words, the payment gateway may be similar to physical point-of-sale (POS) terminal located in retail stores/outlets.

The one or more merchant card processors 2520 may be one or more separate companies from the payment gateway. Although some merchant card processors may have their own payment gateways, a merchant card processor may generally use a third-party payment gateway. Here, the gateway 2510 may include a virtual terminal that allows a merchant (e.g., a partner) to securely login and key in credit card numbers or have a shopping-cart (e.g. from a partner website) connect to the gateway via an APPLICATION PROGRAM INTERFACE (API) to allow for real time processing from the merchant's website.

It should be appreciated that merchant accounts may charge a variety of fees, some periodic, others charged on a per-item or percentage basis. In one embodiment, fees are set by the merchant account provider. In another embodiment, fees may be applied on a per-item or percentage fee basis, which may be passed through the merchant card processor 2520 to a collecting bank 2530 (e.g., a credit card issuing bank) according to a schedule of rates called interchange fees. These interchange fees may be set by VISA,™ MasterCard,™ etc. It should be appreciated that interchange fees may vary depending on card type, circumstances of the transaction, and/or other considerations. For example, as discussed above, if a transaction is made by swiping a card through a credit card terminal, it may qualified for a different interchange fee category than if the card information were manually keyed.

It should also be appreciated that monthly minimum fees may also be applied as a way to ensure that merchants/partners pay a minimum amount in fees each month to cover costs to maintain the account and/or to create minimal profits. Thus, if qualified fees of a merchant/partner do not equal or exceed the monthly minimum, they may be charged up to the monthly minimum to satisfy their minimum fee requirements.

For example, a merchant/partner may have a contract with a $25.00 monthly minimum fee. If all the fees for the most recent month of processing total only $15.00, this merchant may be charged an additional $10.00 to meet their monthly minimum requirements. It should be appreciated that there are fees that are charged, which may not be a part of the monthly minimum, such as statement fees, etc. Monthly minimum charges may or may not be standard.

A batch fee (also known as a batch header fee) may also be charged to a merchant/partner whenever the merchant "settles" their terminal. For example, settling a terminal, also known as "batching," may occur when a merchant/partner sends completed transactions for the day to their acquiring bank for payment. In one embodiment, this may be performed automatically. In another embodiment, a batch may be closed every twenty-four (24) hours. If not, a higher rate may be assessed by the one or more merchant card processors.

Accordingly, in order to support credit card payments, many partners (e.g., spa owners) may pay credit card merchant fees (e.g., interchange fees) to various credit card companies, such as MasterCard, Visa, Discover, American Express, etc. However, because these merchant fees generally depend on the volume of business supported at each partner, some partners may pay upwards to 2-3% for every credit card transaction, especially if they are small spa owners. Because the Management Solution System 122 is a centralized system that may support hundreds or thousands of partners, a substantially lower credit card merchant fee rate may be negotiated (e.g. 1.0%). As a result, a small spa owner, who typically pays 3.0% in credit card transaction fees, may only be charged 2.0% by the Management Solution System 122 when it becomes a participating partner. As a participating partner, the spa may receive the same credit card services through the system 100 and save 1.0% in transaction fees that the spa owner would have never been able to negotiate on its own. Additionally, if the negotiated rate by the system 100 is indeed 1.0%, a profit may be generated under this business model and all parties benefit from the partnership. Furthermore, since these features may be integrated into the Management Solution System 122 platform, other charges may be reduced and/or eliminated, making it more attractive to potential partners. These may include month minimum charge fees and/or batch fees. It should also be appreciated that the rate charged per partner may be determined based on the partner's business volume and/or other similar factors.

It should be appreciated that a transaction fee may be charged per order. In addition, an agreed upon referral fee may also be charged per order. The transaction fees and/or referral fees may be similar to those provided by credit card companies (e.g., $0.05 transaction fee per charge or $2.00 referral fee). Other various fee options may also be provided.

In some embodiments, partners may utilize the Management Solution System 122 as a point-of-sale (POS) system and collect payment directly from customers. Here, customers may remit payment using a variety of pre-defined and/or custom payment types, such as cash, check, Visa,™ MasterCard,™ American Express,™ Discover,™ Japan Credit Bureau (JCB), gift certificate, gift card, gift voucher, cash equivalents, etc. Other various payment types may also be provided.

Figure 26:
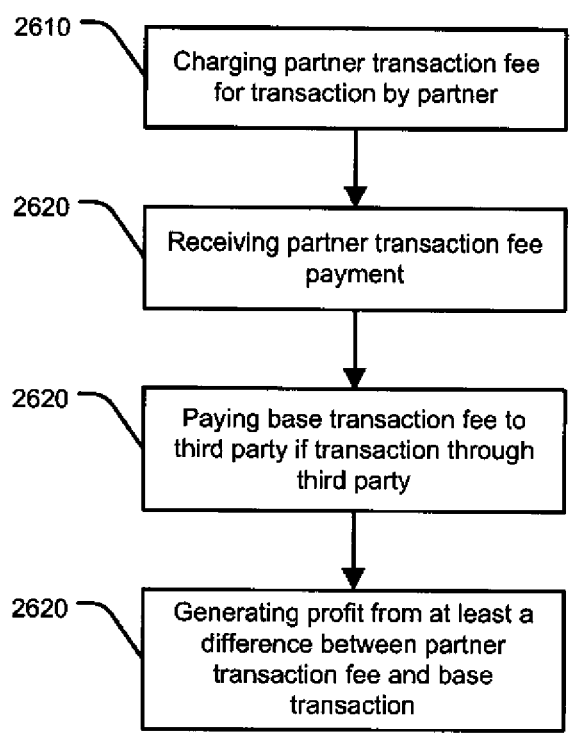
FIG. 26 depicts a illustrative flowchart of a method for processing transactions, according to an exemplary embodiment of the disclosure.

FIG. 26 depicts a illustrative flowchart of a method for processing transactions, according to an exemplary embodiment of the disclosure. The exemplary method 2600 is provided by way of example, as there are a variety of ways to carry out methods disclosed herein. The method 2600 shown in FIG. 26 may be executed or otherwise performed by one or a combination of various systems. The method 2600 is described below as carried out by system 100 in FIG. 1, by way of example, and various elements of system 100 are referenced in explaining the exemplary method 2600 of FIG. 26. Each block shown in FIG. 26 represents one or more processes, methods, or subroutines carried in the exemplary method 200. A computer readable media comprising code to perform the acts of the method 2600 may also be provided. Referring to FIG. 26, the exemplary method 2600 may begin at block 2610.

At block 2610, the Management Solutions System 122 may charge a partner transaction fee for a transaction performed by a partner. At block 2620, the Management Solutions System 122 may receive, from a partner, payment for the partner transaction fee when the partner performs a transaction. At block 2630, the Management Solutions System 122 may pay, in the event the partner performs the transaction through a third party, a base transaction fee to the third party. In this example, the base transaction fee may be equal to or less than the partner transaction fee. At block 2640, the Management Solutions System 122 may receive a profit on the transaction. In this example, the profit may be, at least in part, the difference between the partner transaction fee and the base transaction fee.

The Management Solutions System 122 may collect payment from customers utilizing a variety of different mechanisms. In some embodiments, these may include direct debit, automatic credit card billing, and invoicing. Other various embodiments may also be realized. In other embodiments, for example, transaction fees may be calculated by multiplying a sum of a customer's total monthly paid orders and total monthly unpaid and uncancelled reservations by a negotiated transaction fee percentage. These transaction fees may then be added to any referral fees that a customer has been assessed over the course of the same month or other period of time. In some embodiments, referral fees may be calculated by multiplying a pre-set value (e.g., a flat amount per reservation, a percentage of a total order, etc.) by the number of reservations referred by qualifying referral partners over the course of the same month or other period of time. Other various embodiments may also be provided.

An advantage of web-based management solutions, according to embodiments of the present disclosure, may include significant sales, profitability, and customer retention. In addition, a web-based solution may reduce error in scheduling appointments and/or other time-sensitive services because of real-time or near real-time booking. Furthermore, such a system and method may offer savings and benefits for customers that would otherwise not be available. For example, by relying on customers' feedback, ratings, side-by-side comparisons, data gathered from customer demographics, etc., new product offerings may be provided based on more accurate assessments of customer spending behaviors and shopping trends.

It should be appreciated that while embodiments of the present disclosure are directed to an on-line store (e.g., a spa website) and corresponding products and services (e.g., spa-related items) described above and depicted in the figures, other various implementations maybe also be provided. For example, embodiments of the present disclosure may also be applied to to manage operations for a health care providers (e.g., doctors, dentists, physical therapist, etc.), schools and teachers, automobile bodyshops and menchanics, restaurants, movie theaters, golf tee times, and/or other businesses that may benefit from a web-based management solutions system capable of booking reservations and managing customers, employees, facilities, inventory, payments/accounts receivables, marketing, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A centralized web-based system, comprising:
 a memory; and
 a processor coupled to the memory to perform operations comprising:
  managing, by a management solution system in a computing environment, a schedule of appointments for a plurality of service providers, the computing environment including the management solution system, a web-based user interface, a data storage system communicating in a communication network over communication links, wherein managing the schedule of appointments includes:
   receiving data, via the web-based user interface from a user, related to scheduling an appointment, the data comprising a type of service and location information,
   executing a search across the plurality of service providers to identify a subset of service providers offering the type of service within a radius of a location defined by the location information,
   updating the web-based user interface to include a plurality of possible appointments for the type of service for each service provider of the subset of the plurality of service providers,
   receiving, via the web-based user interface, a user selection of an appointment from the plurality of possible appointments, and
   scheduling the appointment based on the user selection, wherein the receiving, executing, updating, receiving, and scheduling are performed without navigating the user away from the web-based user interface.

2. The centralized web-based system of claim 1, wherein the operations further comprise:
 storing data associated with the appointments, wherein the data comprises a data and a time slot and at least one of a facility, a service, and a servicer.

3. The centralized web-based system of claim 1, wherein the operations further comprise:
 managing employee information for the plurality of service providers, wherein the employee information comprises at least one of personal information, employee schedule, employee services, employee availability, and employee history of transactions.

4. The centralized web-based system of claim 1, wherein the operations further comprise:
 managing payroll information for a plurality of employees associated with each of the plurality of service providers.

5. The centralized web-based system of claim 1, wherein the operations further comprise:
 automatically populating user criteria for the search based on log-in information associated with the user.

6. The centralized web-based system of claim 1, wherein the operations further comprise:
 building an appointment package based on the user selection and two or more services for which the user scheduled the appointment.

7. The centralized web-based system of claim 1, wherein the operations further comprise:
 limiting the search to those facilities that are owned by a partner specified in the web-based user interface.

8. A method, comprising:
 managing, by a management solution system in a computing environment, a schedule of appointments for a plurality of service providers, the computing environment including the management solution system, a web-based user interface, a data storage system communicating in a communication network over communication links, wherein managing the schedule of appointments comprises:
  receiving data, via the web-based user interface from a user, related to scheduling an appointment, the data comprising a type of service and location information,
  executing a search across the plurality of service providers to identify a subset of service providers offering the type of service within a radius of a location defined by the location information,
  updating the web-based user interface to include a plurality of possible appointments for the type of service for each service provider of the subset of the plurality of service providers,
  receiving, via the web-based user interface, a user selection of an appointment from the plurality of possible appointments, and
  scheduling the appointment based on the user selection, wherein the receiving, executing, updating, receiving, and scheduling are performed without navigating the user away from the web-based user interface.

9. The method of claim 8, further comprising:
 storing data associated with the appointments, wherein the data comprises a data and a time slot and at least one of a facility, a service, and a servicer.

10. The method of claim 8, further comprising:
 managing employee information for the plurality of service providers, wherein the employee information comprises at least one of personal information, employee schedule, employee services, employee availability, and employee history of transactions.

11. The method of claim 8, further comprising:
 managing payroll information for a plurality of employees associated with each of the plurality of service providers.

12. The method of claim 8, further comprising:
 automatically populating user criteria for the search based on log-in information associated with the user.

13. The method of claim 8, further comprising:
 building an appointment package based on the user selection and two or more services for which the user scheduled the appointment.

14. The method of claim 8, further comprising:
 limiting the search to those facilities that are owned by a partner specified in the web-based user interface.

15. A non-transitory computer readable medium comprising one or more sequences of instructions, which, when executed by a processor, causes a computing system to perform operations comprising:
 managing, by a management solution system in a computing environment, a schedule of appointments for a plurality of service providers, the computing environment including the management solution system, a web-based user interface, a data storage system communicating in a communication network over communication links, wherein managing the schedule of appointments comprises:

receiving data, via the web-based user interface from a user, related to scheduling an appointment, the data comprising a type of service and location information, executing a search across the plurality of service providers to identify a subset of service providers offering the type of service within a radius of a location defined by the location information, updating the web-based user interface to include a plurality of possible appointments for the type of service for each service provider of the subset of the plurality of service providers, receiving, via the web-based user interface, a user selection of an appointment from the plurality of possible appointments, and scheduling the appointment based on the user selection, wherein the receiving, executing, updating, receiving, and scheduling are performed without navigating the user away from the web-based user interface.

16. The non-transitory computer readable medium of claim 15, further comprising:

storing data associated with the appointments, wherein the data comprises a data and a time slot and at least one of a facility, a service, and a servicer.

17. The non-transitory computer readable medium of claim 15, further comprising:

managing employee information for the plurality of service providers, wherein the employee information comprises at least one of personal information, employee schedule, employee services, employee availability, and employee history of transactions.

18. The non-transitory computer readable medium of claim 15, further comprising:

automatically populating user criteria for the search based on log-in information associated with the user.

19. The non-transitory computer readable medium of claim 15, further comprising:

building an appointment package based on the user selection and two or more services for which the user scheduled the appointment.

20. The non-transitory computer readable medium of claim 15, further comprising:

limiting the search to those facilities that are owned by a partner specified in the web-based user interface.

* * * * *